(12) United States Patent
Suda et al.

(10) Patent No.: US 8,424,669 B2
(45) Date of Patent: Apr. 23, 2013

(54) WORK TRANSPORT APPARATUS AND METHOD

(75) Inventors: Masanaga Suda, Tokyo (JP); Keiji Nasu, Yokohama (JP); Yuuki Yamamoto, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1412 days.

(21) Appl. No.: 11/593,586

(22) Filed: Nov. 7, 2006

(65) Prior Publication Data

US 2007/0101567 A1 May 10, 2007

(30) Foreign Application Priority Data

Nov. 9, 2005 (JP) .................................. 2005-325284
May 1, 2006 (JP) .................................. 2006-127713

(51) Int. Cl.
*B65G 37/00* (2006.01)
(52) U.S. Cl.
USPC .......................... 198/346.2; 198/311; 198/523
(58) Field of Classification Search .................. 198/435,
198/346.2, 346.3, 431, 463.3, 738, 744; 414/339,
414/917, 353, 222.04, 222.05, 396, 401,
414/584, 331.01, 331.06, 331.07, 331.09,
414/331.13, 529, 575, 572, 809, 276
See application file for complete search history.

(56) References Cited

U.S. PATENT DOCUMENTS

| | | | |
|---|---|---|---|
| 2,296,683 A * | 9/1942 | Morgan et al. ............. | 198/463.6 |
| 3,637,095 A * | 1/1972 | Kampfer .................. | 414/331.07 |
| 3,666,081 A * | 5/1972 | Axenfeld ................. | 198/311 |
| 3,750,804 A * | 8/1973 | Lemelson ................. | 414/276 |
| 3,805,974 A * | 4/1974 | Andersson et al. .......... | 414/276 |
| 4,047,625 A * | 9/1977 | Grant ..................... | 414/651 |
| 4,543,026 A * | 9/1985 | Halonen et al. ............ | 414/352 |
| 4,595,330 A * | 6/1986 | O'Brien et al. ............ | 414/276 |
| 4,600,099 A * | 7/1986 | Peddinghaus .............. | 198/744 |
| 4,634,333 A * | 1/1987 | Butterly et al. ........... | 414/331.07 |
| 4,746,258 A * | 5/1988 | Loomer et al. ............. | 414/401 |
| 4,809,963 A | 3/1989 | Kelly | |
| 4,815,914 A * | 3/1989 | O'Brien et al. ............ | 414/276 |
| 4,861,220 A * | 8/1989 | Smith .................... | 414/495 |
| 5,297,483 A * | 3/1994 | Kakida et al. ............. | 104/88.02 |
| 5,353,495 A * | 10/1994 | Terabayashi et al. ........ | 29/714 |
| 5,513,936 A * | 5/1996 | Dean ..................... | 414/273 |

(Continued)

FOREIGN PATENT DOCUMENTS

DE 36 08 217 A1 9/1987
JP 53-7084 A 1/1978

(Continued)

*Primary Examiner* — Gene Crawford
*Assistant Examiner* — William R Harp
(74) *Attorney, Agent, or Firm* — Foley & Lardner LLP

(57) ABSTRACT

A work transport apparatus includes a carriage to carry a work along a guide lane; a work loading mechanism to load the work on the carriage at a work loading position; and a work unloading mechanism to unload the work from the carriage at a work unloading position. Each of the work loading mechanism, the carriage and the work unloading mechanism includes a work sliding incline sloping down to move the work held on a holder from the work loading mechanism through the carriage to the work unloading mechanism. Each of the work unloading mechanism, the carriage and the work loading mechanism includes a holder sliding incline sloping down to move the holder from the work unloading mechanism through the carriage to the work loading mechanism.

40 Claims, 24 Drawing Sheets

U.S. PATENT DOCUMENTS

| | | | |
|---|---|---|---|
| 5,577,597 A * | 11/1996 | Kakida et al. | 198/465.1 |
| 5,735,661 A * | 4/1998 | De Frondeville et al. | 414/276 |
| 5,779,428 A * | 7/1998 | Dyson et al. | 414/536 |
| 5,873,473 A * | 2/1999 | Pater | 211/183 |
| 6,065,923 A * | 5/2000 | Foster | 414/401 |
| 6,186,725 B1 * | 2/2001 | Konstant | 414/276 |
| 6,269,938 B1 * | 8/2001 | Lutz | 198/560 |
| 6,468,015 B1 * | 10/2002 | Konstant | 414/276 |
| 6,588,608 B2 * | 7/2003 | Pater | 211/151 |
| 6,675,946 B2 * | 1/2004 | Lutz | 193/35 TE |
| 2010/0300840 A1 * | 12/2010 | O'Brien | 198/560 |
| 2010/0300841 A1 * | 12/2010 | O'Brien | 198/563 |

FOREIGN PATENT DOCUMENTS

| | | |
|---|---|---|
| JP | 60-97113 A | 5/1985 |
| JP | 8-188236 A | 7/1996 |
| JP | 9-201737 A | 8/1997 |
| JP | 11-830 A | 1/1999 |
| JP | 2000-25911 A | 1/2000 |
| WO | WO 99/02434 A2 | 1/1999 |

* cited by examiner

WORK TRANSPORT APPARATUS AND METHOD

BACKGROUND OF THE INVENTION

The present invention relates to work transport apparatus and work transport method, and more specifically to work transport apparatus and method using a self-propelled vehicle.

A published Japanese patent application publication No. H09(1997)-201737 shows a work transport system for conveying a work with a self-propelled vehicle running along a guide lane on a floor in a factory. In this system, a work is loaded on a wheeled carriage at a production line, and transported with the carriage pulled by the self-propelled vehicle to a storage location automatically without the intervention of human operation. At the storage location, the carriage is disconnected from the self-propelled vehicle, and taken out of the guide lane to a work unloading position at which the work is unloaded from the carriage. The empty carriage is returned to the guide lane by manual operation or by another self-propelled vehicle.

SUMMARY OF THE INVENTION

In the above-mentioned work transport system, however, there is a need for manual operation or automatic operation with another self-propelled vehicle to return an empty carriage to the production line.

Therefore, it is an object of the present invention to provide work transport apparatus and method adequate for area efficiency and cost reduction.

According to one aspect of the present invention, a work transport apparatus comprises: a carriage to carry a work by moving along a guidepath; a work loading mechanism to load the work on the carriage at a work loading position on the guidepath; and a work unloading mechanism to unload the work from the carriage at a work unloading position on the guidepath. Each of the work loading mechanism, the carriage and the work unloading mechanism includes a work sliding incline sloping down to move the work held on a holder from the work loading mechanism through the carriage to the work unloading mechanism. Each of the work unloading mechanism, the carriage and the work loading mechanism includes a holder sliding incline sloping down to move the holder from the work unloading mechanism through the carriage to the work loading mechanism.

According to another aspect of the present invention, a work transport method comprises: a first method element of loading a work on a carriage at a work loading position on a guidepath from a work loading station; a second method element of transporting the work with the carriage from the work loading position to a work unloading position along the guidepath; and a third method element of unloading the work from the carriage at the work unloading position on the guidepath, to a work unloading station. Each of the work loading station, the carriage and the work unloading station is provided with a work sliding incline sloping down to move the work held in a holder from the work loading station through the carriage to the work unloading station. Each of the work unloading station, the carriage and the work loading station is provided with a holder sliding incline sloping down to move the holder from the work unloading station through the carriage to the work loading station.

According to still another aspect of the present invention, a work transport apparatus for transporting a work held in a holder from a work loading position to a work unloading position, comprises: work sliding means for defining a work sliding incline sloping down from an upper end to a lower end in a first direction and sliding a work held on a holder on the work sliding incline; and holder sliding means for defining a holder sliding incline sloping down from an upper end to a lower end in a second direction opposite to the first direction, and sliding a holder in an empty state on the holder sliding incline. One of the work sliding incline and the holder sliding incline is located above the other.

DETAILED DESCRIPTION OF THE INVENTION

Figure 1:
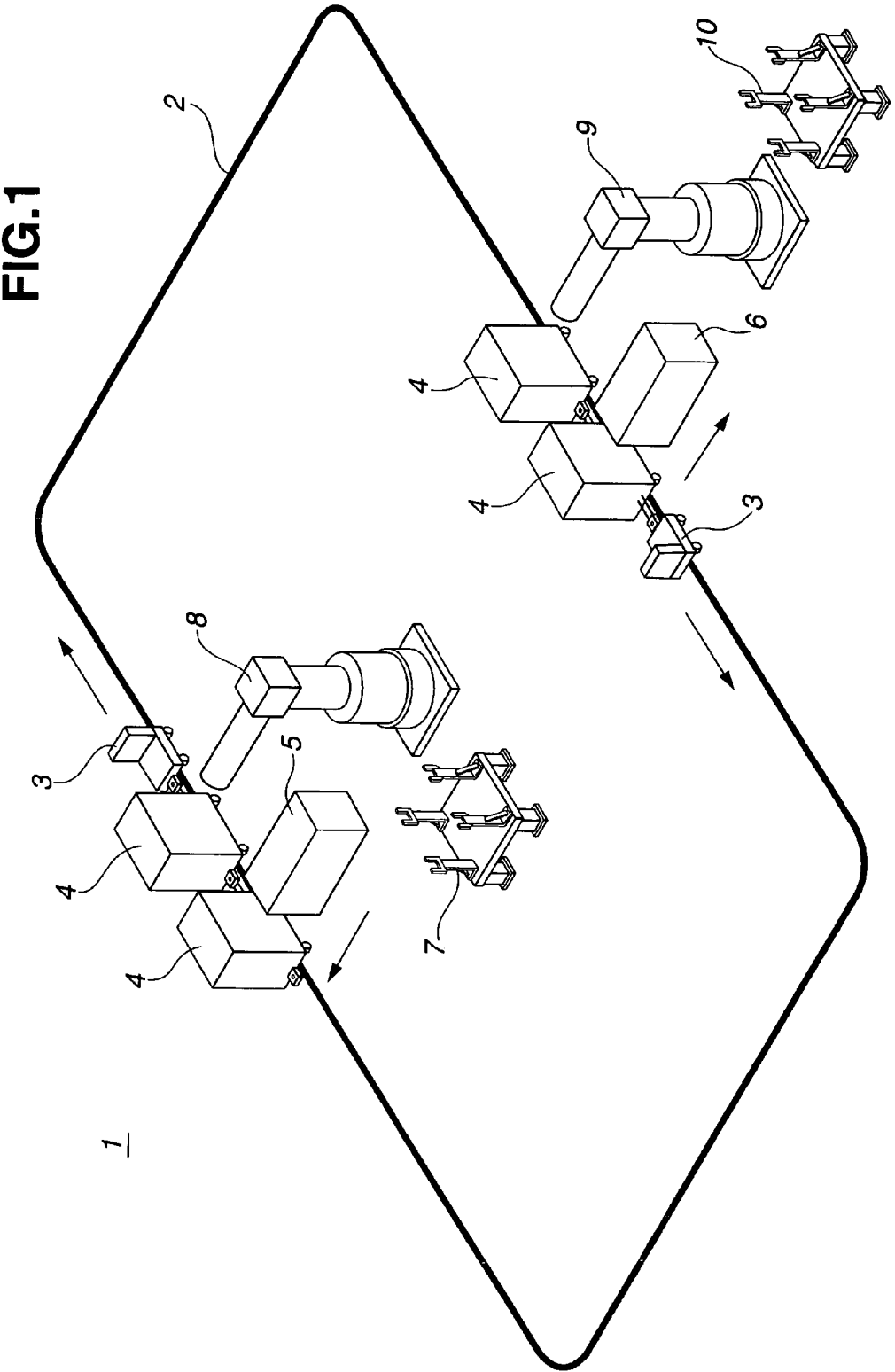
FIG. 1 is a schematic perspective view showing a transport system according to a first embodiment of the present invention.
Figures 2A, 2B:
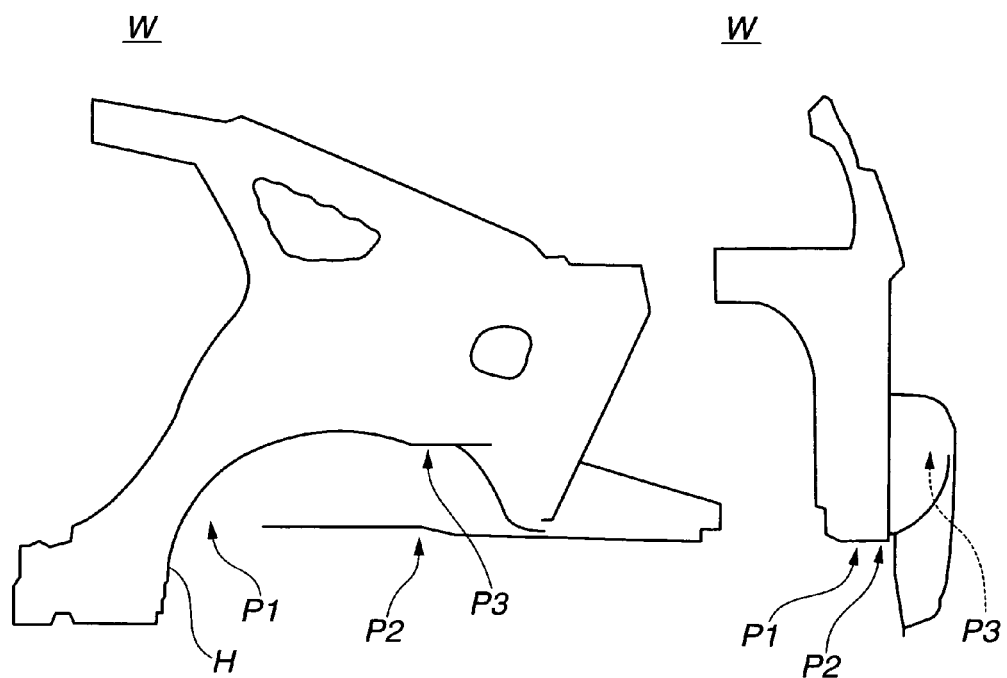
FIGS. 2A and 2B are, respectively, front view and side view showing a work to be transported by the transport system of FIG. 1.
Figure 3:
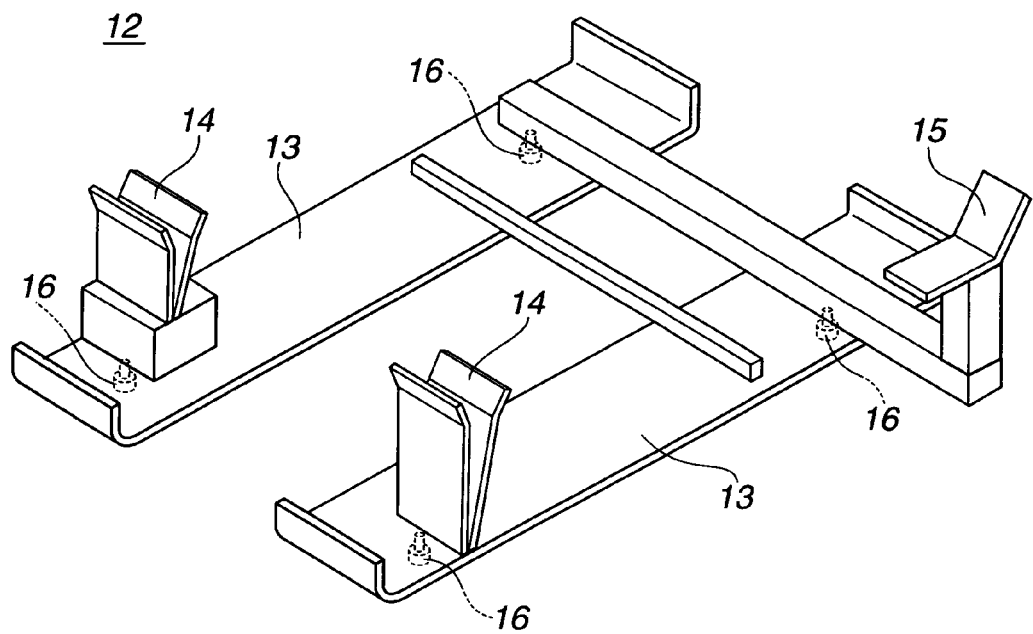
FIG. 3 is a perspective view of a holder for holding a work in the transport system according to the first embodiment.
Figure 4:
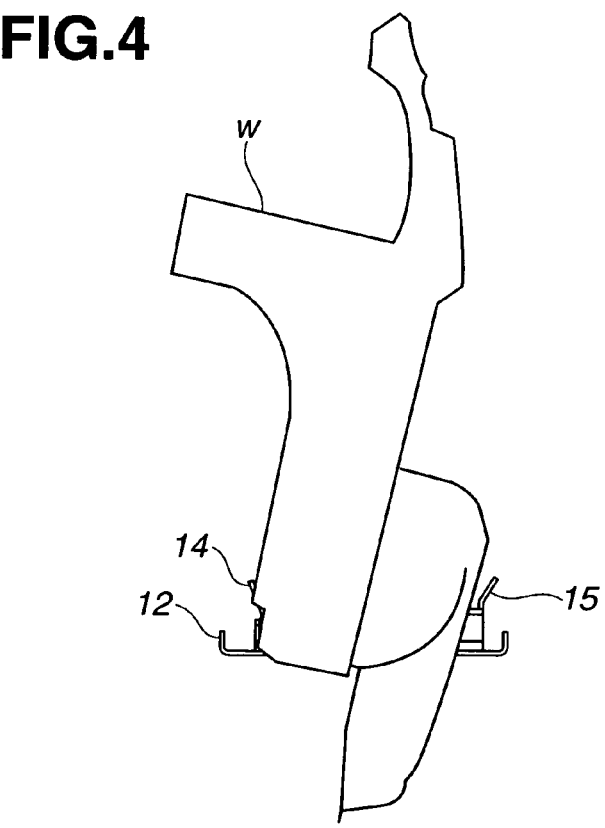
FIG. 4 is a side view of a work held on the holder.
Figure 5:
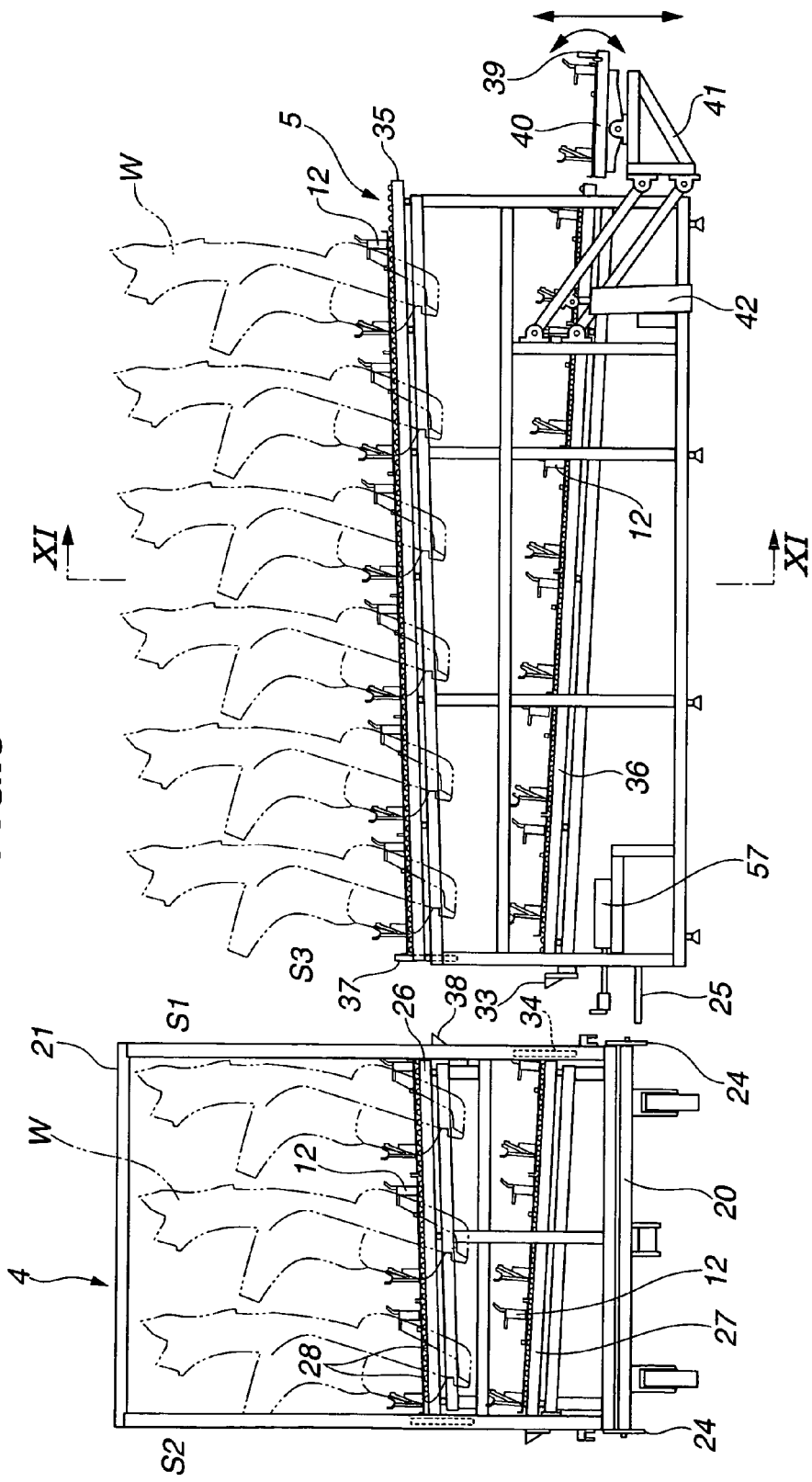
FIG. 5 is a side view showing a work loading mechanism and a carriage of the work transport system according to the first embodiment.
Figure 6:
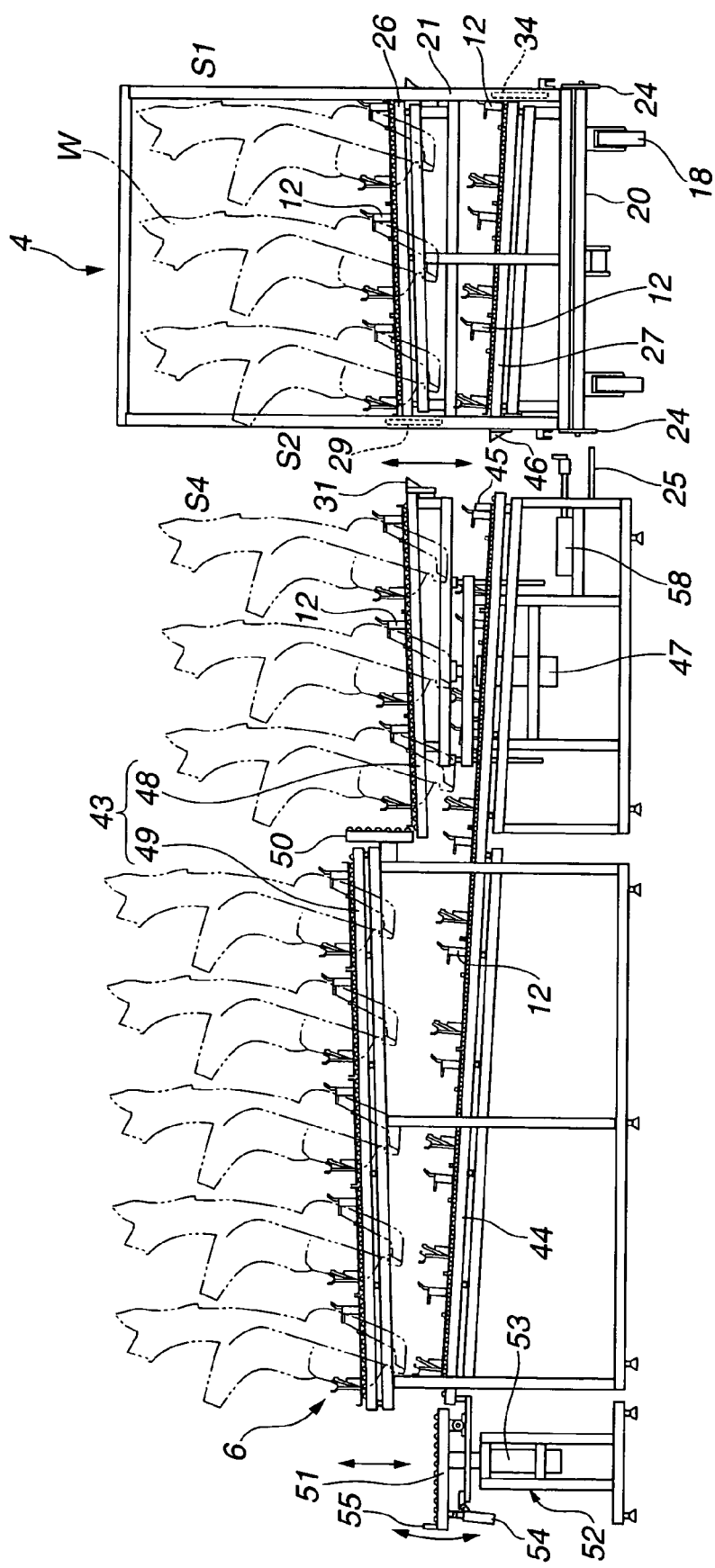
FIG. 6 is a side view showing the carriage and a work unloading mechanism of the work transport system according to the first embodiment.
Figure 7:
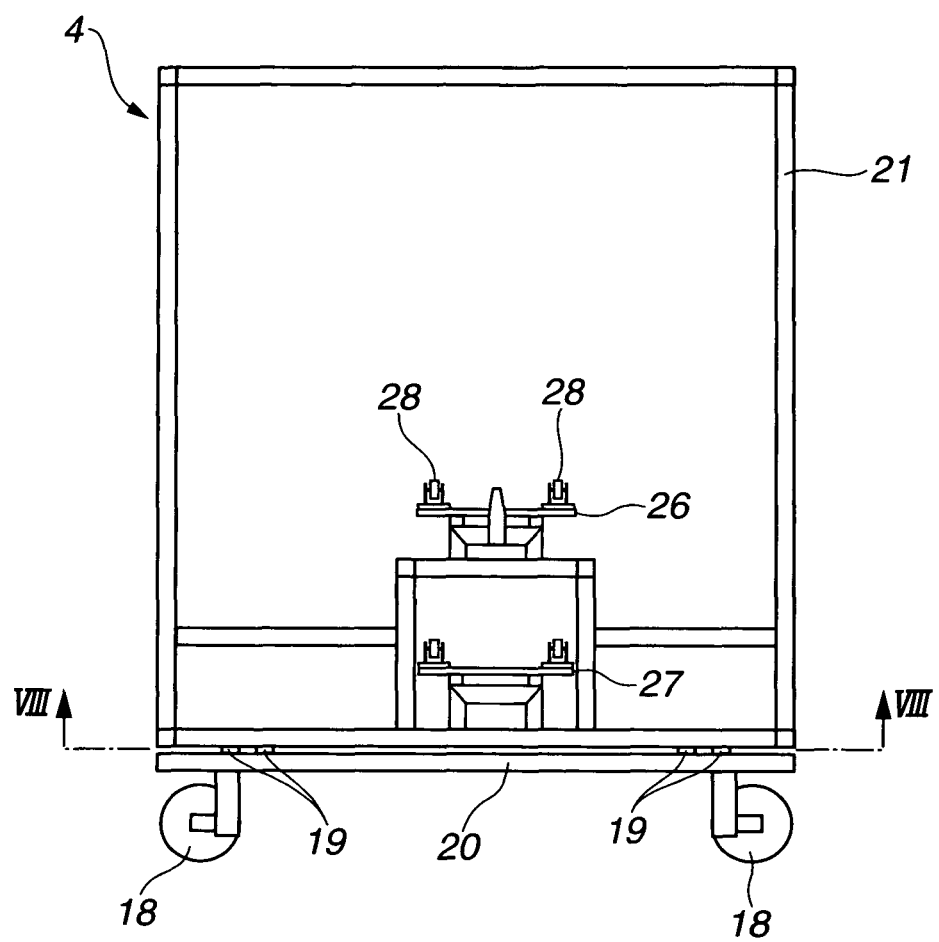
FIG. 7 is a side view of the carriage as viewed from one lateral side.
Figure 8A:
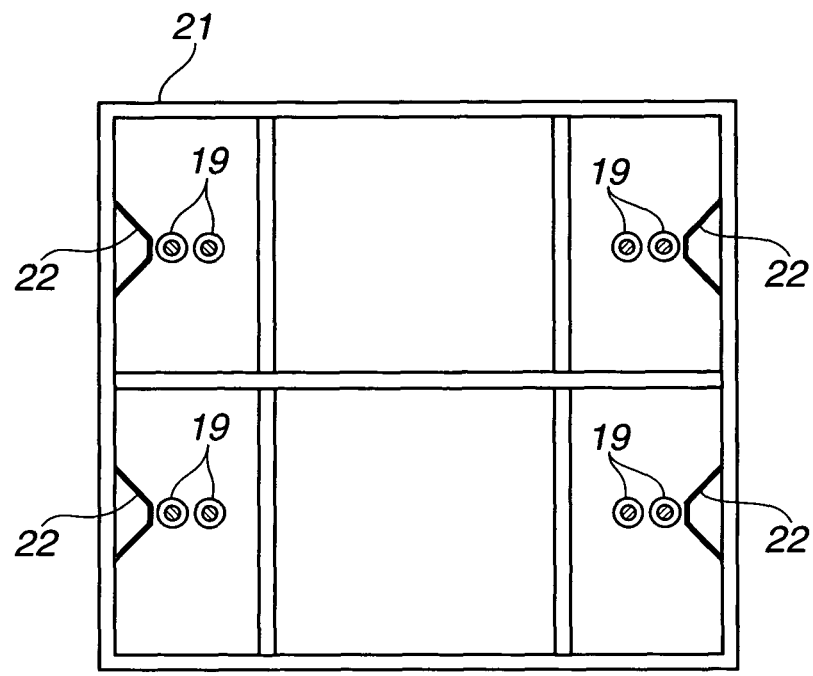
FIGS. 8A and 8B are views as viewed from a plane shown by a line VIII-VIII in FIG. 7, for showing an upper housing of the carriage, respectively at a normal position and a shifted position.
Figure 8B:
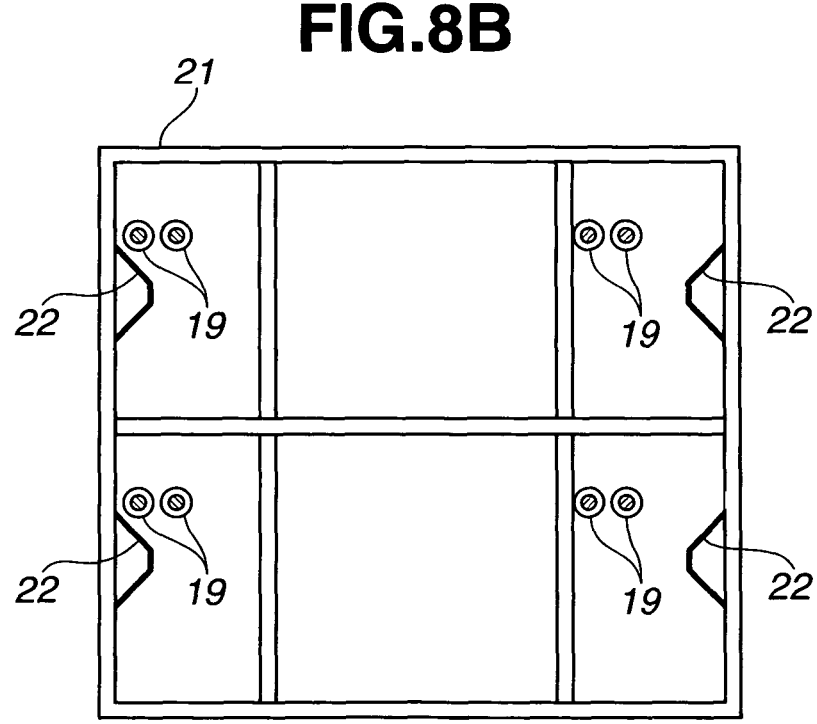
Figure 9A:
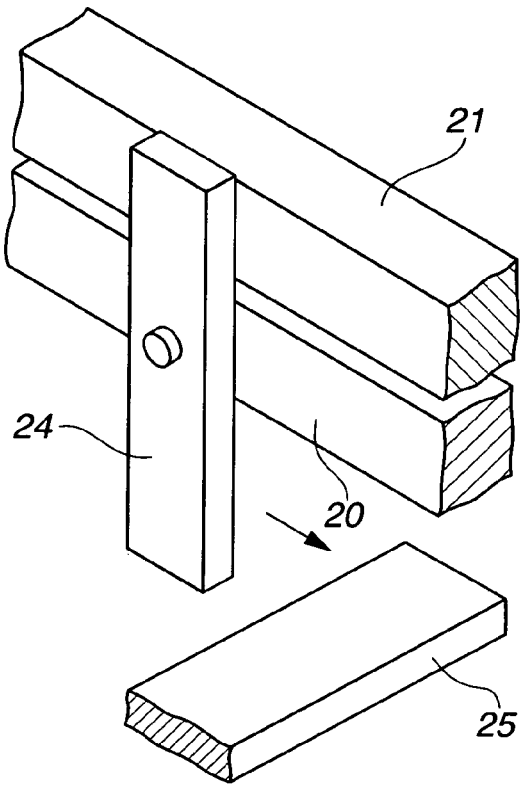
FIGS. 9A and 9B are perspective views showing a stopper in the transport system of FIG. 1, respectively, in a latch state and a release state.
Figure 9B:
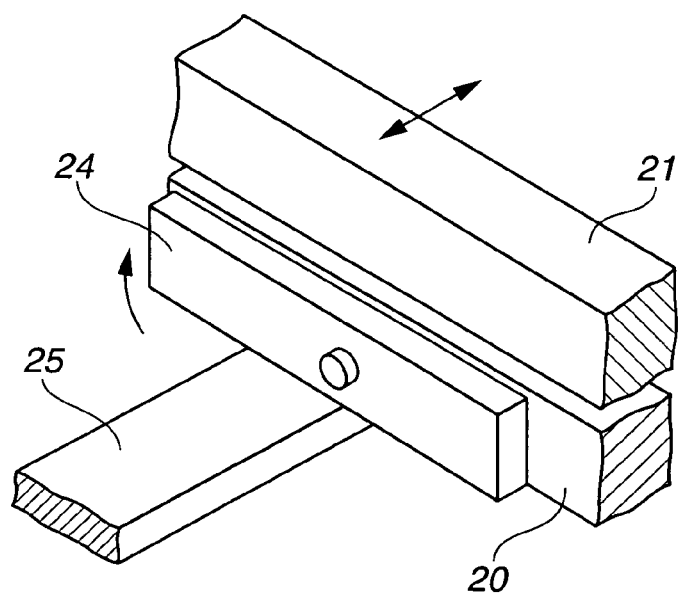
Figure 10:
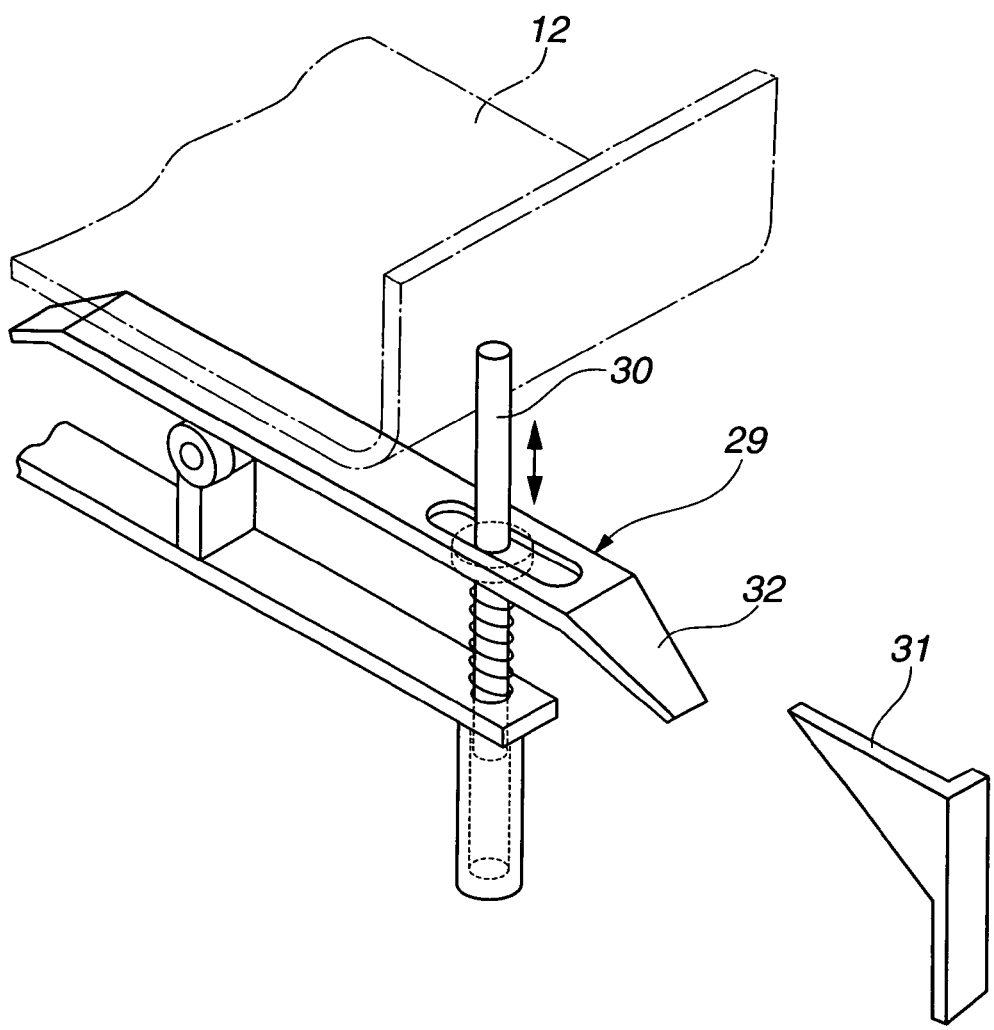
FIG. 10 is a perspective view showing a stopping device of the transport system of FIG. 1.
Figure 11:
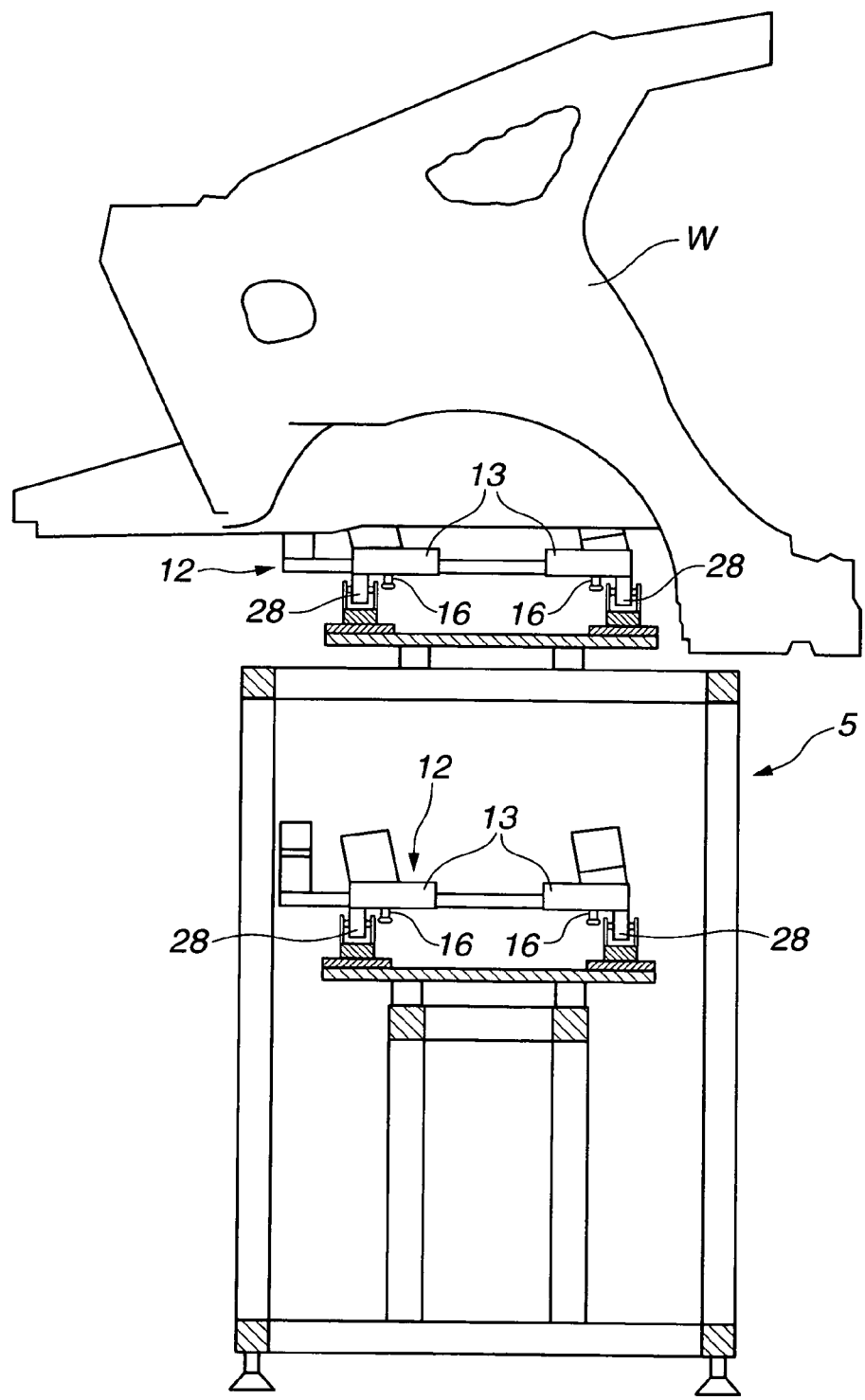
FIG. 11 is a sectional view of the work loading mechanism, taken across a line XI-XI shown in FIG. 5.

FIGS. 1~18 show a work transport system or apparatus 1 according to a first embodiment of the present invention. FIG. 1 is a schematic perspective view showing the work transport system 1 according to the first embodiment. FIGS. 2A and 2B show work to be transported by the transport system of FIG. 1 in front view and side view, respectively. FIG. 3 is a perspective view of a holder for holding a work in the transport system according to the first embodiment. FIG. 4 is a side view of a work held on the holder. FIG. 5 is a side view showing a work loading mechanism and a carriage. FIG. 6 is a side view showing the carriage and a work unloading mechanism. FIG. 7 is an elevation of the carriage as viewed from one lateral side. FIGS. 8A and 8B are views as viewed from an imaginary plane shown by a line VIII-VIII in FIG. 7, showing an upper housing of the carriage, respectively at a normal position and a shifted position. FIGS. 9A and 9B are perspective views showing a stopper, respectively, in a latch state and a release state. FIG. 10 is a perspective view showing a stopping device. FIG. 11 is a sectional view of the work loading mechanism, taken across a line XI-XI shown in FIG. 5.

The work transport system 1 of the first embodiment is equipment for transporting or conveying works or workpieces W produced and/or processed in a production line, in a lot of a predetermined amount.

As shown in FIG. 1, the work transport system 1 includes a self-propelled (automotive) vehicle 3 (which, in this example, is AGV: automated guided vehicle) to run along a guide lane 2 as a guidepath (or guide way); at least one carriage or dolly 4 connected with, and pulled by, self-propelled vehicle 3; a work loading mechanism 5 located adjacent to the guide lane 2; and a work unloading mechanism 6 located adjacent to guide lane 2. A jig 7 holds works W produced by the production line. A first handling robot 8 transfers works W from jig 7 to work loading mechanism 5. Works W are loaded on carriages 4 at a work loading position by work loading mechanism 5; carried to a work unloading position adjacent to work unloading mechanism 6 with carriages 4 pulled by the self-propelled vehicle 3, and unloaded at the work unloading position by work unloading mechanism 6. A second handling robot 9 transfers works W from work unloading mechanism 6 to a jig 10.

According to this embodiment, the work W is a vehicle body panel. In an example shown in FIGS. 2A and 2B, the work W is a vehicular rear pillar panel. In the case of conveyance of the work in the form of such a panel, the work W is stable in a horizontally lying posture. However, the horizontal posture is not desirable for the area efficiency. Therefore, a vertical or upright posture is desirable in general. In this case, in order to hold the work W stably in the upright posture, it is preferable to convey the work W while holding the work W with a work holder 12 as shown in FIG. 3.

The work holder 12 shown in FIG. 3 includes a pair of plate-shaped runners 13 (extending in parallel to each other like a pair of skis); two inner holding portions 14 for holding two inner support points P1 and P2 of rear pillar panel W shown in FIGS. 2A and 2B; and one outer holding portion 15 for holding an outer support point P3 of rear pillar panel W shown in FIGS. 2A and 2B. In this example, there is provided only one outer holding portion 15 to prevent injury due to holding of a hem surface H shown in FIG. 2A. However, it is optional to provide two or more of the outer holding portions 15 when the hem surface H is not held, or there is no substantial danger of injury. Under each of runners 13, there are provided two position control rollers 16 each projecting downwards from the lower surface of the runner 13 and rotating in a surface parallel to the lower surface of the runner 13 about an axis perpendicular to the lower surface of the runner 13 as shown in FIG. 3 and FIG. 11.

As shown in FIG. 4, a rear pillar panel W is retained by a work holder 12 so that the center of gravity is posited approximately at a middle between the inner holding portions 14 and the outer holding portion 15. Accordingly, a rear pillar panel W is retained in a slightly leaning posture, by the inner and outer holding portions 14 and 15, because of the structure of the rear pillar panel W.

Each carriage 4 can approach the work loading mechanism 5 and work unloading mechanism 6 by being pulled by self-propelled vehicle 3, as shown in FIGS. 5, 6 and 7. Each carriage 4 has a work loading side S1 facing to the work loading mechanism 5 at the work loading position adjacent to work loading mechanism 5, and a work unloading side S2 facing to the work unloading mechanism 6 at the work unloading position adjacent to work unloading mechanism 6. The loading and unloading sides S1 and S2 are two opposite sides of carriage 4 shaped like a rectangular parallelepiped. In this example, the work loading side S1 is one of the right and left sides of carriage 4, and the work unloading side S2 is the other.

When a plurality of carriages 4 are connected, the carriages 4 are connected, from one self-propelled vehicle, in series in the form of a train. However, the number of carriages 4 is not restrictive. The number of carriages 4 pulled by one self-propelled vehicle 3 may be one or may be two or more. Each carriage 4 includes a lower base or lower carriage member 20 having wheels of tires 18 on the lower side, and ball casters 19 on the upper side, as best shown in FIG. 7, and an upper housing or upper carriage member 21 mounted, through ball casters 19, on the lower base 20 so that upper housing 21 can move, in a horizontal plane, relative to lower base 20. As shown in FIGS. 8A and 8B, the ball casters 19 are provided in four pairs at four support positions on the upper surface of lower base 20. The upper housing 21 includes four guides 22 each corresponding uniquely to one of the four pairs of ball casters 19. Two of the guides 22 project from a first one of the front and rear side walls of upper housing 21 toward the opposite side wall, and the other two of the guides 22 project from a second one of the front and rear side walls of upper housing 21 toward the opposite side wall. In this example, there are provided two of the ball casters 19 at each of the four support positions to disperse the load. However, it is optional to employ only one ball caster 19 at each support position if the strength of ball caster 19 is sufficient.

A stopper 24 is provided on each of the work loading side S1 and the work unloading side S2 of the lower base 20, as shown in FIGS. 9A and 9B. As shown in these figures, stopper 24 is in the form of a bar, and stopper 24 is mounted on lower base 20 so that stopper 24 can swing in a vertical direction about a horizontal axis. The stopper 24 is normally held in a vertically extending posture by its own weight as shown in FIG. 9A. In this posture, an upper portion of stopper 24 projects upward beyond the upper surface of lower base 20, and thereby limits a lateral movement of upper housing 21 by abutting on a side surface of upper housing 21. When the carriage 4 comes closer to the work loading mechanism 5 or work unloading mechanism 6, the stopper 24 on the corresponding side abuts against a push member 25 projecting in the form of a bar, from the work loading mechanism or work unloading mechanism 6 toward the guide lane 2. Then, by being pushed by the push member 25, stopper 24 swings to a horizontal posture as shown in FIG. 9B, and thereby allows the upper housing 21 to move in the lateral direction.

As shown in FIGS. 5, 6 and 7, carriage 4 includes a work sliding second incline (or work carrying incline) 26 sloping downwards from the work loading side S1 to work unloading side S2, and a holder sliding second incline (or holder carrying incline) 27 sloping downwards from the work unloading side S2 to work loading side S1. Each of the inclines 26 and 27 is a roller conveyor having two rows of rollers arranged at intervals. Work sliding incline 26 can convey one or more works W retained in holders 12. Holder sliding incline 27 can convey one or more empty holders 12 in an empty state holding no works. In this example, as shown in FIG. 7, holder sliding incline 27 is located just below work sliding incline 26.

A stopping device 29 is provided at the lower end of work sliding second incline 26 on the work unloading side S2, as shown in FIG. 6 and FIG. 10, and arranged to control the movement of works W on the work sliding second incline 26 along the incline 26. Stopping device 29 includes a stopping member 30 projecting upwards above the incline 26. Stopping member 30 is urged by a spring, and arranged to move up and down. Stopping device 29 further includes a receiving member 32 which is pushed by a projecting portion (or releasing portion) 31 of work unloading mechanism 6, and thereby moves the stopping member 30. When the carriage 4 comes closer to the work unloading mechanism 6, the projecting (or releasing) portion 31 of the mechanism 6 pushes the receiving portion 32 of stopping device 29 downwards from a projected or upper position to prevent the sliding movement of works W, to a withdrawn or lower position to allow the sliding movement of works W on the incline 26. Instead of the stopping device 29 shown in FIG. 10, it is possible to employ a stopping device of any other structure to prevent and allow a sliding movement of a load on a conveyor.

A stopping device 34 is provided at the lower end of holder sliding second incline 27 on the work loading side S1, and arranged to control the movement of holders 12 on the holder sliding second incline 27 along incline 27. Stopping device 34 is substantially identical in construction as the above-mentioned stopping device 29. When the carriage 4 comes closer to the work loading mechanism 5, a projecting (or releasing) portion 33 of the mechanism 5 shown in FIG. 5 pushes a stopping member of the device 34 downwards from a projected (upper) position to prevent the movement of holders 12, to a withdrawn (lower) position to allow the movement of holders 12 on the incline 27.

The work loading mechanism 5, as shown in FIG. 5, includes a work sliding first incline (work loading incline) 35 sloping upwards from a guidepath's (or front) side S3 facing to the guide lane 2, to an opposite (or rear) side (right side as viewed in FIG. 5), and a holder sliding third incline (holder unloading incline) 36 sloping downwards from the guidepath's (front) side S3 to the opposite (rear) side. Each of the inclines 35 and 36 is a roller conveyor having two rows of rollers arranged at intervals. Work sliding first incline 35 can convey one or more works W retained in holders 12. Holder sliding third incline 36 can convey one or more empty holders 12 in the empty state holding no works. Holder sliding third incline 36 is located just below work sliding first incline 35.

A stopping device 37 is provided at the lower end of work sliding first incline 35 on the guide way's side S3, and arranged to control the movement of works W on the work sliding first incline 35 along incline 35. Stopping device 37 is substantially identical in construction as the above-mentioned stopping device 29 for the work sliding second incline 26. When the carriage 4 comes closer to the work loading mechanism 5, a projecting (or releasing) portion 38 of the carriage 4 shown in FIG. 5 pushes a stopping member of the stopping device 37 downwards from a projected (upper) position to prevent the movement of works W, to a withdrawn (lower) position to allow the movement of works W on the incline 35.

A work loading side (or first) lifter 41 is provided on the rear side opposite to the guidepath's (front) side S3 of work loading mechanism 5. Loading side lifter 41 includes a platform 40 movable up and down between the level of the lower end of holder sliding third incline 36 to the level of the upper end of work sliding first incline 35. Platform 40 is moved up and down by an actuator 42 through a link mechanism. Platform 40 is swingable about a horizontal axis so that the inclination of platform 40 can be varied. Platform 40 extends from a first (front) end facing to the incline 35 or 36, to a second (rear) end at which a stopper member 39 projects upwards from platform 40 to prevent a holder 12 on platform 40 from falling off the platform 40. Lifter 41 can serve as at least a part of a moving mechanism to move work holders 12 between a holder sliding incline and a work sliding incline above the holder sliding incline.

The work unloading mechanism 6, as shown in FIG. 6, includes a work sliding third incline (or work unloading incline) 43 sloping downwards from a guidepath's (or front) side S4 facing to the guide lane 2, to an opposite (rear) side (left side as viewed in FIG. 6), and a holder sliding first incline (or holder loading incline) 44 sloping upwards from the guidepath's side S4 to the opposite (rear) side. Each of the inclines 43 and 44 is a roller conveyor having two rows of rollers arranged at intervals. Work sliding third incline 43 can convey one or more works W retained in holders 12. Holder sliding first incline 44 can convey one or more empty holders 12 holding no works. Holder sliding first incline 44 is located just below work sliding third incline 43.

A stopping device 45 is provided at the lower end of holder sliding first incline 44 on the guidepath's side S4, and arranged to control the movement of holders 12 on the holder sliding first incline 44 along incline 44. Stopping device 45 is substantially identical in construction as the above-mentioned stopping device 29 for the work sliding second incline 26. When carriage 4 comes closer to the work unloading mechanism 6, a projecting (or releasing) portion 46 of the carriage 4 shown in FIG. 6 pushes a stopping member of the stopping device 45 downwards from a projected (upper) position to prevent the movement of holder 12 to a withdrawn (lower) position to allow the movement of holders 12 on the incline 44.

The work sliding third incline 43 of this embodiment is composed of a lift incline portion (or front portion) 48 which is provided on the guidepath's (front) side S4 and which is arranged to be moved up and down, and a fixed incline portion (or rear portion) 49 which is not liftable and which is located so that the lift incline portion 48 is located between the guide lane 2 and the fixed incline portion 49. A vertical roller conveyer 50 is fixed to the upper (or front) end of fixed portion 49. Vertical roller conveyer 50 extends substantially vertically at a position between the lift incline (front) portion 48 and fixed incline (rear) portion 49.

A work unloading side lifter 52 is provided on the rear side opposite to the guidepath's (front) side S4 of work unloading mechanism 6. Work unloading side lifter 52 includes a platform 51 movable up and down between the level of the lower (rear) end of work sliding third incline 43 to the level of the upper (rear) end of holder sliding first incline 44. Platform 51 is moved up and down by an actuator 53. Platform 51 is swingable about a horizontal axis, and an actuator 54 is arranged to vary the inclination of platform 51 by moving a swingable (rear) end portion of platform 51 up and down. Platform 51 extends from a first (front) end facing to the incline 43 or 44, to a second (rear) end at which a stopper member 55 projects upwards from platform 51 to prevent a work W on platform 51 from falling off the platform 51. Lifter 52 can serve as at least a part of the moving mechanism to move work holders 12 between a holder sliding incline and a work sliding incline above the holder sliding incline.

A drawing device 57 projects from the guidepath's (front) side S3 of work loading mechanism 5 as shown in FIG. 5. Drawing device 57 is operated by an actuator. Drawing device 57 can serve as a connecting device to draw a carriage to the work loading position so that the work sliding incline 35 of the work loading mechanism 5 and the work sliding incline 26 of carriage 4 are aligned to allow a work on a holder to slide continuously from work sliding incline 35 of work loading mechanism 5 to the work sliding incline 26 of carriage 4. Drawing device 57 can draw the upper housing 21 of a carrier 4 adjacent to work loading mechanism 5, toward the loading mechanism 5 or move the upper housing 21 away from loading mechanism 5. Similarly, a drawing device 58 (serving as a connecting device) projects from the guidepath's (front) side S4 of work unloading mechanism 6 as shown in FIG. 6. By being operated by an actuator, the drawing device 58 draws the upper housing 21 of a carrier 4 adjacent to the unloading mechanism 6 closer to the mechanism 6 or pushes the upper housing 21 away from the mechanism 6.

When work holder 12 slides on the roller conveyor of one of the inclines 26, 27, 35, 36, 43 and 44, the left and right runners 13 of holder 12 slide, respectively, on the left and right series of rollers 28 of the roller conveyer, as shown in FIG. 11. On each of the left and right sides, position control rollers 16 of holder 12 roll on an inner side wall of the series of rollers 28 and thereby prevent the holder 12 from derailing.

Figure 12:
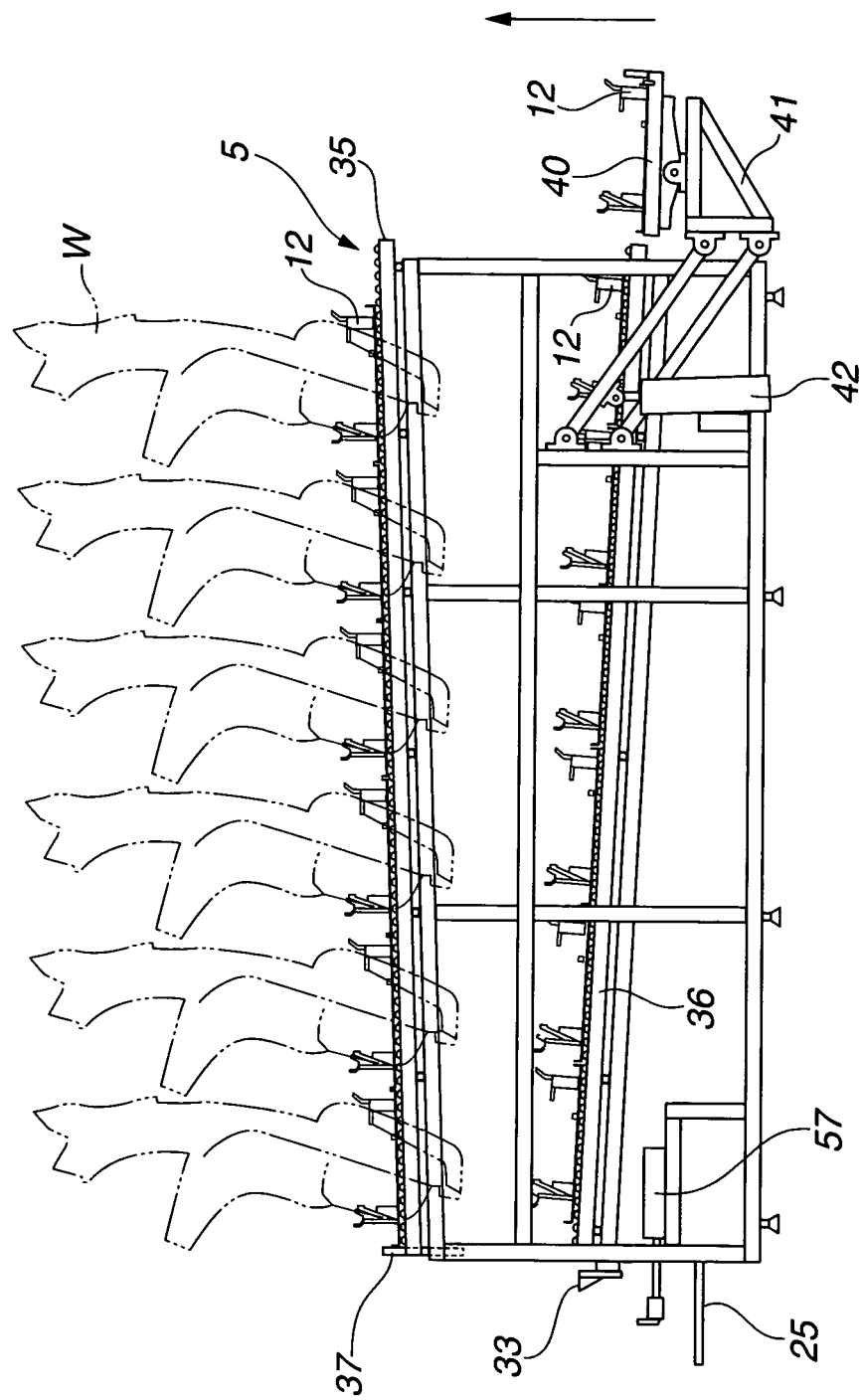
FIG. 12 is a side view for illustrating a holder lifting operation of lifting a holder with a work loading side lifter of the work loading mechanism in the transport system according to the first embodiment.
Figure 13:
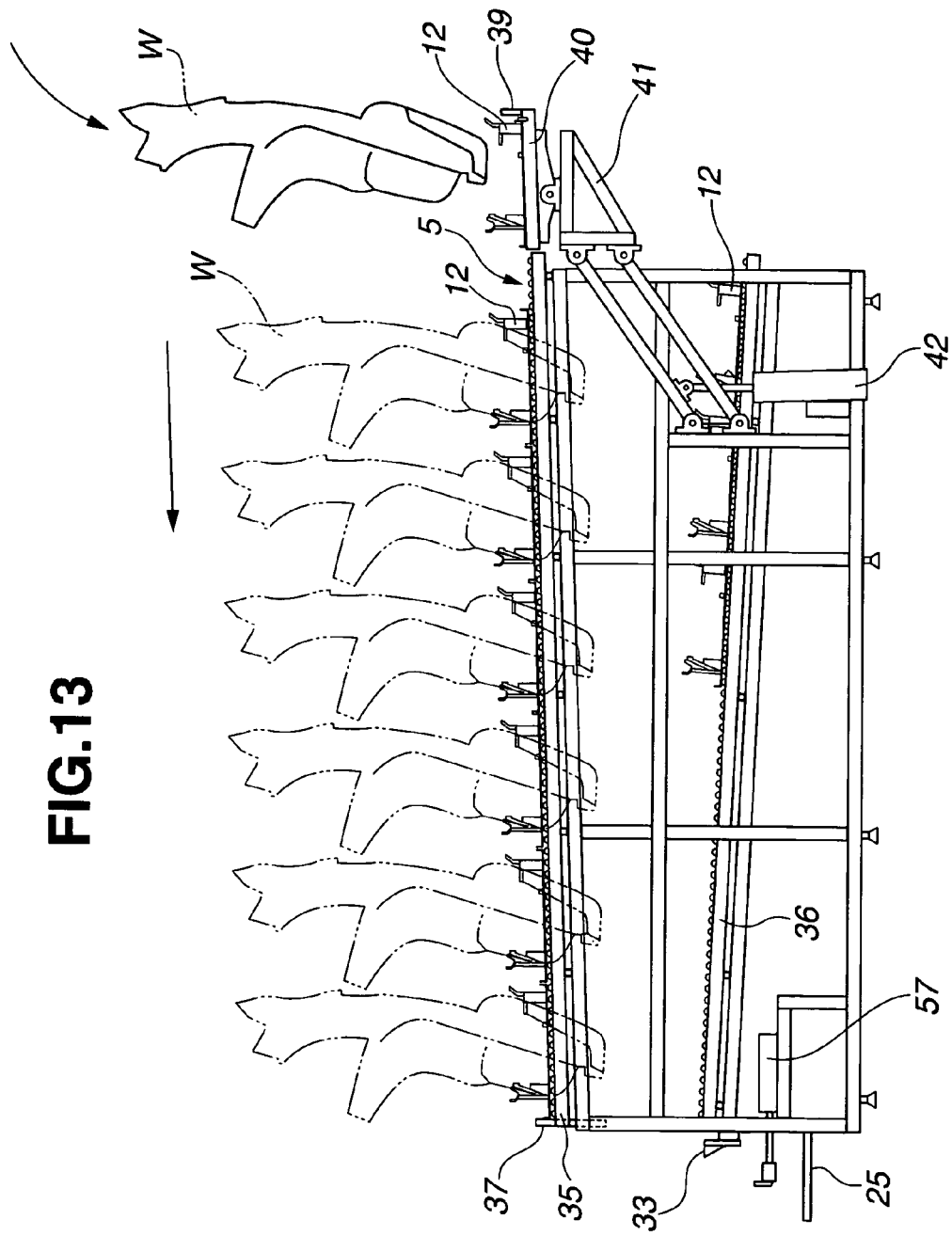
FIG. 13 is a side view for illustrating a feeding operation of feeding a work to the work loading mechanism.
Figure 14:
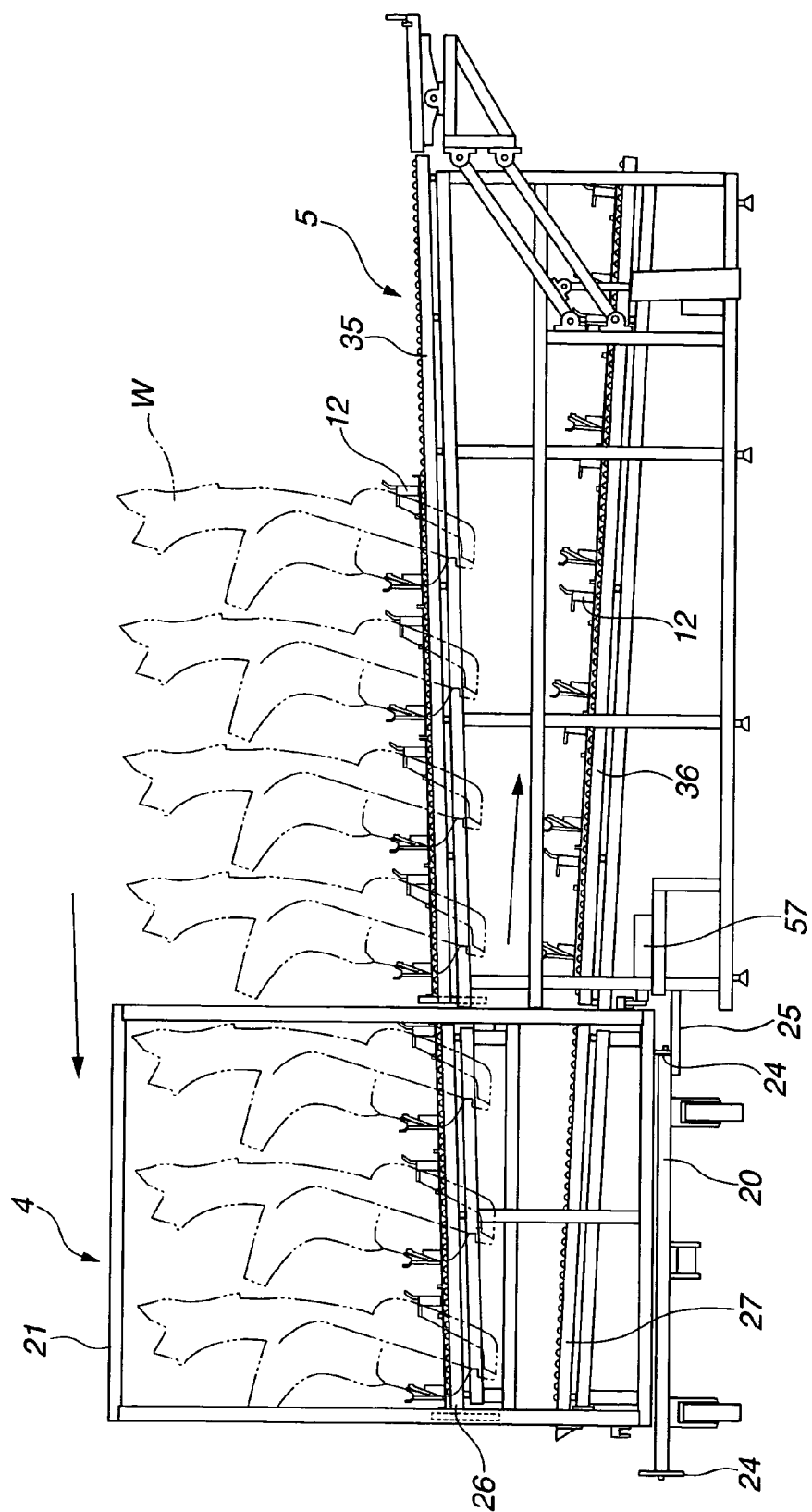
FIG. 14 is a side view for illustrating a work loading operation of loading a work from the work loading mechanism to the carriage.
Figure 15:
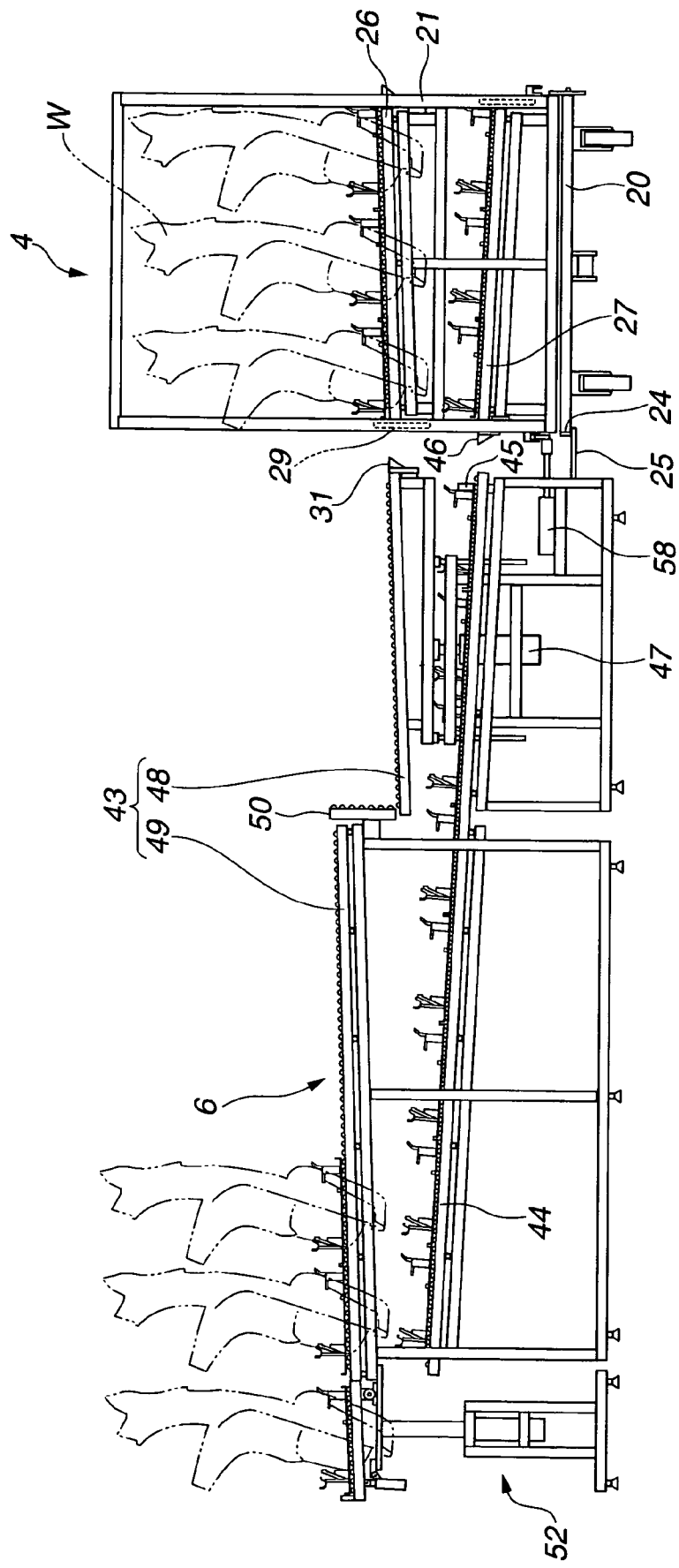
FIG. 15 is a side view for illustrating a connecting operation of connecting the carriage with the work unloading mechanism.
Figure 16:
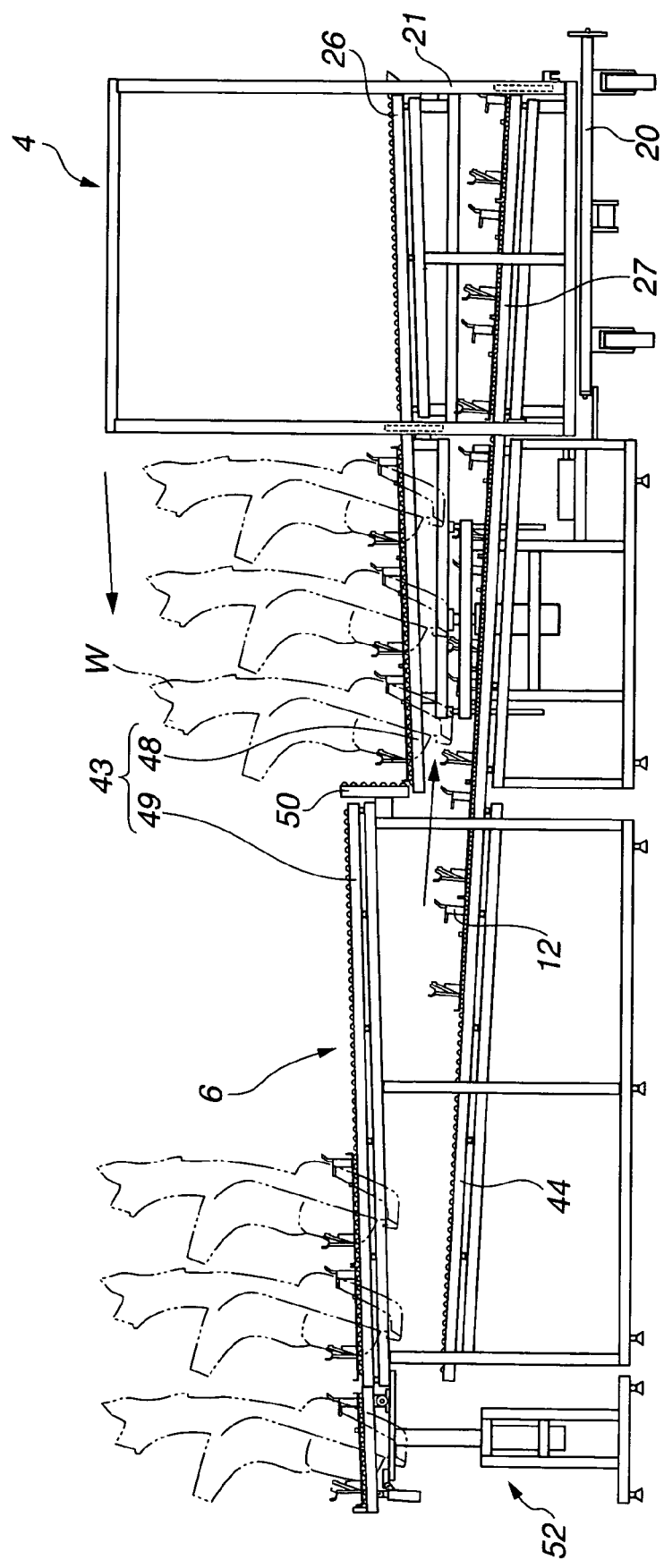
FIG. 16 is a side view for illustrating a work unloading operation of unloading a work from the carriage to the work unloading mechanism.
Figure 17:
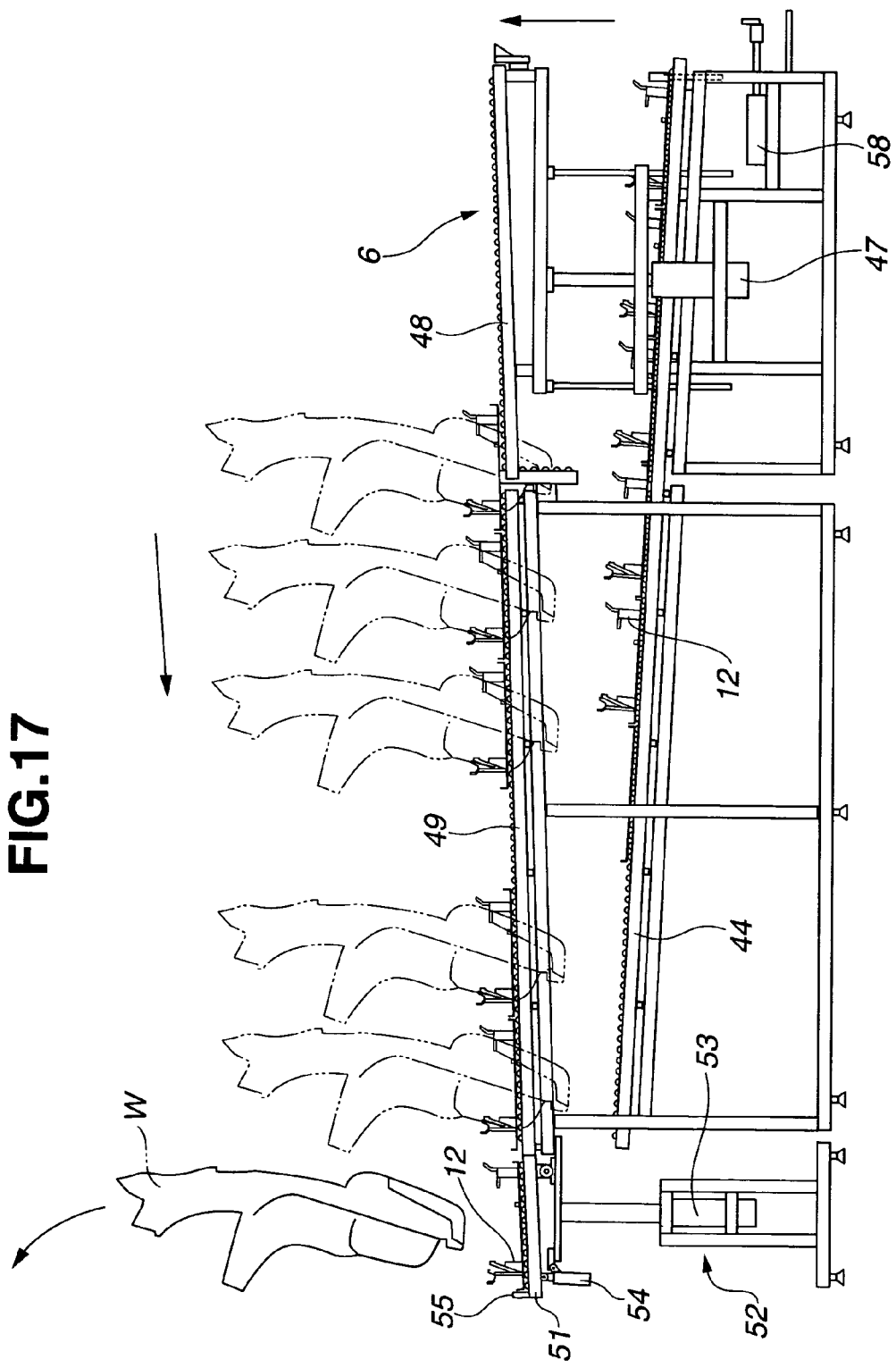
FIG. 17 is a side view for illustrating an incline lifting operation and a work removing operation in the work unloading mechanism.
Figure 18:
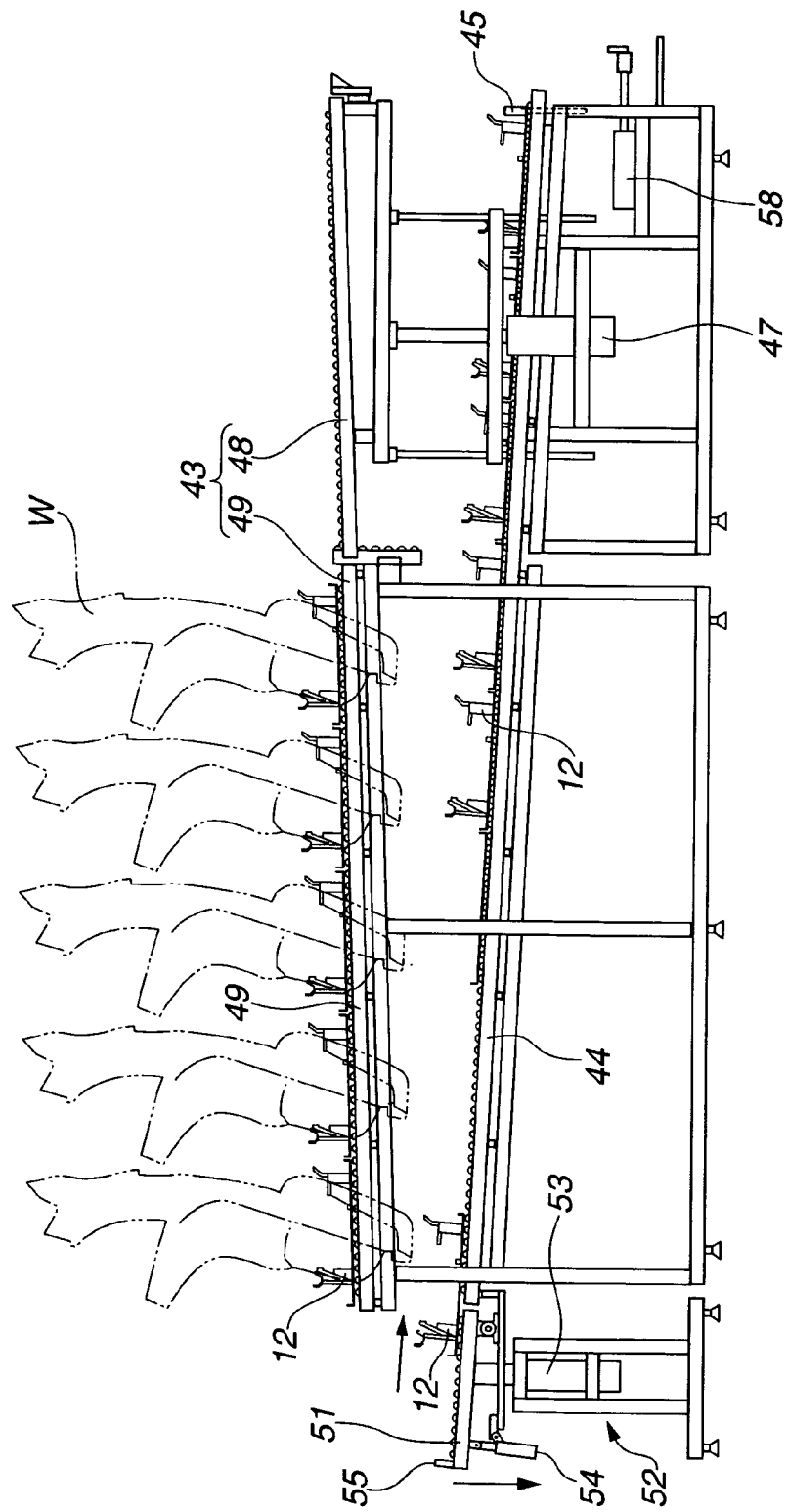
FIG. 18 is a side view for illustrating a holder lowering operation of lowering a holder with a work unloading side lifter on the rear side of the work unloading mechanism.

The work transport system according to the first embodiment is used and operated in the following manner. FIG. 12 is a side view for illustrating a holder lifting operation of lifting a holder with a work loading side lifter of the work loading mechanism in the transport system according to the first embodiment. FIG. 13 is a side view for illustrating a feeding operation of feeding a work to the work loading mechanism. FIG. 14 is a side view for illustrating a work loading operation of loading a work from the work loading mechanism to the carriage. FIG. 15 is a side view for illustrating a connecting operation of connecting the carriage with the work unloading mechanism. FIG. 16 is a side view for illustrating a work unloading operation of unloading a work from the carriage to the work unloading mechanism. FIG. 17 is a side view for illustrating an incline lifting operation and a work removing operation in the work unloading mechanism. FIG. 18 is a side view for illustrating a holder lowering operation of lowering a holder with a work unloading side lifter on the rear side of the work unloading mechanism.

First, as shown in FIG. 12, the platform 40 of work loading side lifter 41 is lowered, and one empty holder 12 is slid from the holder sliding third incline 36 onto platform 40. Then, loading lifter 41 raises the holder 12 on platform 40 to the higher position adjacent to the upper (rear) end of work sliding first incline 35.

Then, first handling robot 8 takes up a work W produced in the production line and stored in jig 7, from the jig 7, and places the work W on the holder 12 resting on platform 40, as shown in FIG. 13. Then, the holder 12 in an occupied state holding the work W is allowed to slide from platform 40 onto work sliding incline 35, and further to slide on the roller conveyor of work sliding incline 35 until the sliding movement is limited by stopping device 37 provided at the lower (front) end of the work sliding incline 35. In the same manner, a next empty holder 12 is lifted by lifter 41, and a next work W is placed on the holder 12 by first handling robot 8. Thus, the work transport system can feed a plurality of works W to a work loading station of work loading mechanism 5, by allowing works W one after another to slide along work sliding incline 35 of work loading mechanism 5, and arranging a series of works W on work sliding first incline 35, as shown in FIG. 13.

Then, as shown in FIG. 14, one carriage 4 pulled by self-propelled vehicle 3 is stopped at the work loading position. During the movement of carriage 4 to the work loading position, stopper 24 of the carriage 4 on the first side S1 is released, and the upper housing 21 become movable in a horizontal plane relative to lower base 20. Then, drawing device 57 draws the upper housing 21 of carriage at the work loading position toward work loading mechanism 5. Therefore, ball casters 19 are moved away from the guides 22, so that the upper housing 21 can move not in the lateral direction toward the work loading mechanism 5, but also in a direction in which the carriage 4 can travel (see FIG. 8B). Therefore, even if the parking position of carriage 4 is slightly off the correct work loading position, the upper housing 21 of carriage 4 is moved to the correct position such that the work sliding incline 35 of the work loading mechanism and the work sliding incline 26 of carriage 4 are aligned to allow a work on a holder to slide continuously from work sliding incline 35 of work loading mechanism 5 to work sliding incline 26 of carriage 4.

When upper housing 21 is drawn to work loading mechanism 5, the projecting (or releasing) portion 38 formed in upper housing 21 forces the stopping member of stopping device 37 to move downward from work sliding first incline 35. Therefore, one or more works W each held by one holder 12 slide from work sliding first incline 35 to work sliding second incline 26 of carriage 4. In this way, one or more works are loaded on the carriage 4. In this example, the carriage 4 can carry three works as shown in FIG. 14. However, the invention is not limited to this number of works. The number of works which one carriage can support is set by the size of a work W and the size of a carriage 4.

When upper housing 21 is drawn to work loading mechanism 5, on the other hand, the projecting (or releasing) portion 33 formed in work loading mechanism 5 forces the stopping member of stopping device 34 to move downward from holder sliding second incline 27. Therefore, one or more empty holders 12 slide from holder sliding second incline 27 to holder sliding third incline 36 of work loading mechanism 5. In this way, one or more empty holders 12 are unloaded from the carriage 4 to the work loading station. This unloading operation of empty holders from the carriage 4 can be simultaneous with the loading operation of works onto the carriage 4.

Thereafter, the upper housing 21 is pushed back to the original position on lower base 20 by drawing device 57. During this, ball casters 19 move along guides 22, and guides 22 guide the movement of upper housing 21 to a predetermined correct position on lower base 20. When upper housing 21 is moved apart from work loading mechanism 5, the stopping members of work sliding first incline 35 and holder sliding second incline 27 move upwards again to the upper position to prevent sliding movement of holders 12.

When a plurality of carriages 4 are connected with self-propelled vehicle 3, works W are loaded on each carriage 4 and holders 12 are unloaded from each carriage 4 by repeating a work loading operation and a holder unloading operation in the same manner.

Then, the carriage (or carriages) 4 is moved by self-propelled vehicle 3 from the work loading position, and the carriage (or one of the carriages) is parked at the work unloading position adjacent to the front side of work unloading mechanism 6, as shown in FIG. 15. During the movement of carriage 4 to the work unloading position, stopper 24 of the carriage 4 on the second side S2 is released, and the upper housing 21 become movable in a horizontal plane relative to lower base 20. Then, drawing device 58 draws the upper housing 21 of carriage at the work unloading position toward work unloading mechanism 6. Therefore, ball casters 19 are moved away from the guides 22, so that the upper housing 21 can move not in the lateral direction toward work unloading mechanism 6, but also in a direction in which the carriage 4 can travel by being pulled by self-propelled vehicle 3. Therefore, even if the parking position of carriage 4 is slightly off the correct work unloading position, the upper housing 21 of carriage 4 is moved to the correct position such that the work sliding incline 26 of carriage 4 and the work sliding incline 43 of work unloading mechanism 6 are aligned to allow a work on a holder to slide continuously from work sliding incline 26 of carriage 4 to work sliding incline 43 of work unloading mechanism 6.

When upper housing 21 is drawn to work unloading mechanism 6, the projecting (or releasing) portion 31 formed in work unloading mechanism 6 forces the stopping member 30 of stopping device 29 to move downward from work sliding second incline 26. Therefore, one or more works W each held by one holder 12 slide from work sliding second incline 26 of carriage 4 to work sliding third incline 43 of work unloading mechanism 6, as shown in FIG. 16. In this way, one or more works are unloaded from the carriage 4. In this case, the front portion 48 of work sliding third incline 43 is held at a lower position to form a continuous slope with work sliding second incline 26 of carriage 4. Therefore, work W on holder 12 slides down along the front portion 48 of work sliding third incline 43 until the sliding movement is limited by vertical roller conveyor 50.

When upper housing 21 is drawn to work unloading mechanism 6, on the other hand, the projecting (or releasing) portion 46 formed in carriage 4 forces the stopping member of stopping device 45 to move downward from holder sliding first incline 44. Therefore, one or more empty holders 12 slide from holder sliding first incline 44 to holder sliding second incline 27 of carriage 4. In this way, one or more empty holders 12 are loaded onto the carriage 4 from the work unloading station. This loading operation of empty holders to the carriage 4 can be simultaneous with the unloading operation of works from the carriage 4.

Thereafter, the upper housing 21 is pushed back to the original position on lower base 20 by drawing device 58. During this, ball casters 19 move along guides 22, and the guides 22 guide the movement of upper housing 21 to the predetermined correct position on lower base 20. When upper housing 21 is moved apart from work unloading mechanism 6, the stopping members 29 and 45 of work sliding second incline 26 and holder sliding first incline 44 move upwards again to the upper position to prevent sliding movement of holders 12.

When a plurality of carriages 4 are connected with self-propelled vehicle 3, works W are unloaded from each carriage 4 and holders 12 are loaded onto each carriage 4 by repeating a work unloading operation and a holder loading operation in the same manner.

Works W unloaded from carriage 4 onto the front portion 48 of work sliding third incline 43 are moved upward by lifting the front portion 48 until a level difference between front portion 48 and rear portion 49 is reduced to zero, and front portion 48 are aligned with rear portion 49. When front and rear portions 48 and 49 are aligned so as to form a single continuous slope, the works on holders 12 slide from front portion 48 to rear portion 49 of work sliding third incline 43.

Works W slide along the rear portion 49 and a work at the leading position stops at the work unloading side lifter 52. Then, work held in a holder 12 on the lifter 52 is removed from the holder 12, as shown in FIG. 17, by second handling robot 9 and placed on the jig 10; and the holder in the empty state is left on the lifter 52.

Then, as shown in FIG. 18, the empty holder 12 is lower by lifter 52 to the level of the upper end of holder sliding first incline 44, and the platform 51 is inclined to cause the empty holder 12 to slide from the platform 51 to holder sliding first incline 44. The empty holder 12 slides along holder sliding first incline 44 until the sliding movement is limited by stopping device 45 at the lower end of holder sliding first incline 44. In this way, works are removed from the work unloading mechanism 6 one after another, and the resulting empty holders 12 are lined up along holder sliding first incline 44 by repeating the same operation.

After works are unloaded and empty holders are loaded at the work unloading position, carriage 4 is moved from the work unloading position to the work loading position along the guide lane 2 so as to form a closed loop. At the work loading position, works are loaded on the carriage 4, and empty holders 12 are unloaded from the carriage in the same manner as mentioned before.

In the state shown in FIG. 12, platform 40 is aligned with holder sliding incline 36 so as to form a continuous sloping surface extending straight and sloping in a rearward direction of work loading mechanism 5. In the state shown in FIG. 13, platform 40 is aligned with work sliding incline 35 so as to form a continuous sloping surface extending straight and sloping in a forward direction toward the front end of work loading mechanism 5. In the state shown in FIG. 14, the work sliding inclines 35 and 26 both extending straight are aligned so as to form a continuous sloping surface extending straight and sloping in the forward direction, and the holder sliding inclines 27 and 36 both extending straight are aligned so as to form a continuous sloping surface extending straight and sloping in the rearward direction opposite to the forward direction. In the state shown in FIG. 16, the work sliding incline 26 and the front portion 48 of the work sliding incline 43 both extending straight are aligned so as to form a continuous sloping surface extending straight and sloping in a rearward direction of the work unloading mechanism 6, and the holder sliding inclines 44 and 27 both extending straight are aligned so as to form a continuous sloping surface extending straight and sloping in a forward direction opposite to the rearward direction. In the state shown in FIG. 17, the front and rear portions 48 and 49 of work sliding incline 43 and platform 51 are aligned so as to form a continuous sloping surface extending straight and sloping in the rearward direction from the front end of the work unloading mechanism 6 toward the rear end. In the state shown in FIG. 18, platform 51 is inclined and aligned with holder sliding incline 44.

In the work transport system 1 according to the first embodiment, the work sliding inclines 35, 26 and 43 and the holder sliding inclines 44, 27 and 36 are opposite in the sloping direction, so that there arises a level difference of a considerable amount between both ends of each of the work loading mechanism 5 and work unloading mechanism 6. However, lifters 41 and 52 can absorb the level differences. Either or both of lifters 41 and 52 can serve as a moving mechanism to move holders 12 between the holder sliding incline and the work sliding incline of at least one of the work loading mechanism 5 and the work unloading mechanism 6.

The work sliding inclines 35, 26 and 43 and the holder sliding inclines 44, 27 and 36 are inclined. Therefore, it is possible to load and unload the load that is work held by holder 12 or holder 12 in the empty state by causing the load to slide by its own weight without the need for power and drive mechanism for moving the load, to the advantage of cost reduction.

The stopping devices 29, 34, 37 and 45 limiting the movement of works or holders can be operated only by a drawing operation of drawing carriage 4 to work loading mechanism 5 or work unloading mechanism 6. Accordingly, it is possible to connect carriage 4 with work loading mechanism 5 or work unloading mechanism 6, and to start the loading or unloading operation of works and holders.

The loading and unloading operations can be performed without disconnecting carriage 4 from self-propelled vehicle 3 and without moving carriage 4 away from the guide lane 2. Therefore, there is no need for operation and mechanism for taking out carriage 4 from the guide lane and for returning carriage to the guide lane, to the advantage of cost reduction. There are no need for manual operation and no need for another self-propelled vehicle for such operations. Moreover, there is no need for providing, in a self-propelled vehicle, an actuator to connect carriage 4 with self-propelled vehicle, again. There is no need for preparing a parking lot for stocking carriages disconnected from self-propelled vehicle.

In each of the carriage 4, work loading mechanism 5 and work unloading mechanism 6, one of the work sliding incline 35, 26 or 43 and the holder sliding incline 36, 27 and 44 is located above the other. This arrangement is advantageous to the reduction of area needed for the work loading and unloading mechanisms, and the carriage.

Figure 19:
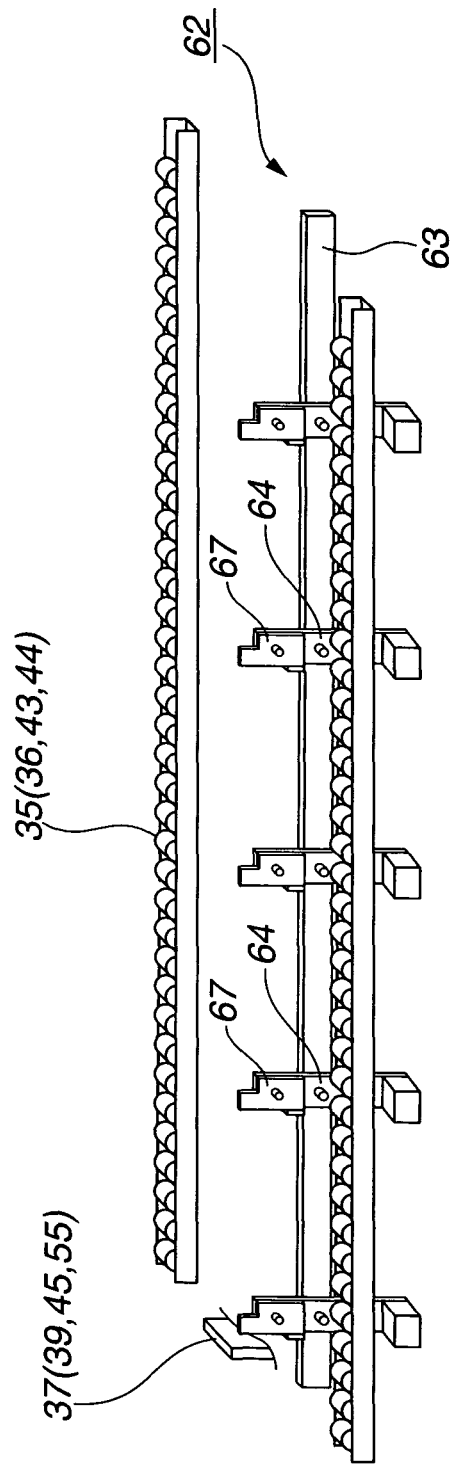
FIG. 19 is a perspective view showing a part of one incline in a work transport system according to a second embodiment of the present invention.

FIGS. 19-25 are views for illustrating a work transport system according to a second embodiment of the present invention. FIG. 19 is a perspective view showing a part of one incline in a work transport system according to the second embodiment. FIGS. 20A, 20B and 20C are perspective views showing a part of a driving device for the incline of FIG. 19, respectively, in a first state in which a rotary member is in a balanced state, a second state in which the rotary member is rotated, and a third state in which a swing member is rotated.

Work transport system 61 of the second embodiment is different from work transport system 1 according to the first embodiment, only in the provision of a holder driving mechanism or device 62 for move holders 12 forcibly.

The holder driving device 62 may be provided at least one of the inclines 35, 36, 43 and 44 of work loading mechanism 5 and work unloading mechanism 6. In the example shown in FIG. 19, the holder driving device 62 is provided in each of the inclines 35, 36, 43 and 44 of work loading mechanism 5 and work unloading mechanism 6. If a power source can be mounted on carriage 4, the holder driving device 62 can be provided for at least one of the inclines 26 and 27 of carriage 4.

Figure 20A:
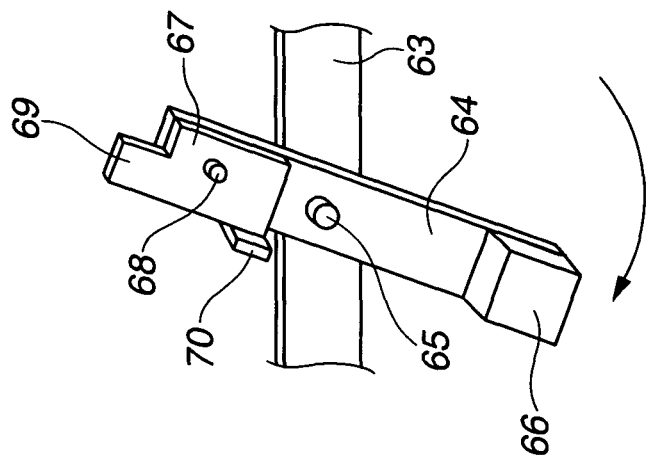
FIGS. 20A, 20B and 20C are perspective views showing a part of a driving device for the incline of FIG. 19, respectively, in a first state in which a rotary member is in a balanced state, a second state in which the rotary member is rotated, and a third state in which a swing member is rotated.

As shown in FIGS. 19 and 20A, the holder driving device 62 includes a flat bar (driving rod or driving member) 63 which can reciprocate along the incline 35, 36, 43 or 44. Flat bar 63 is connected with a driving source such as a hydraulic cylinder, and driven always to move back and forth.

A plurality of swingable members or pendulums 64 are arranged along the incline 35, 36, 43 or 44. Each of swingable members 64 is swingablly mounted on flat bar 63 through a swing shaft 65 extending in a transverse horizontal direction perpendicular to the sloping direction of the incline 35, 36, 43 or 44. The swingable member 64 has a lower end provided with a plumb 66 and an upper end portion which projects upwards in a balanced state as shown in FIG. 20A while the lower end of swingable member 64 is at a lowermost position. A rotary member 67 is swingablly mounted on the upper end portion of swingable member 64 through a rotation shaft 68 extending in parallel to the swing shaft 65. Rotary member 67 includes an abutting portion 69 which is located at the upper end and projects upwards beyond the incline 35, 36, 43 or 44 in a balanced state.

Figure 20B:
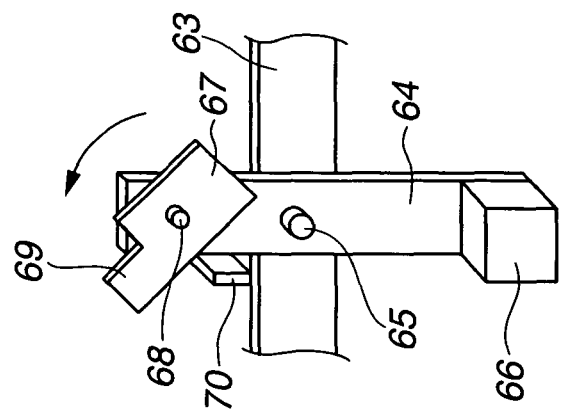
Figure 20C:
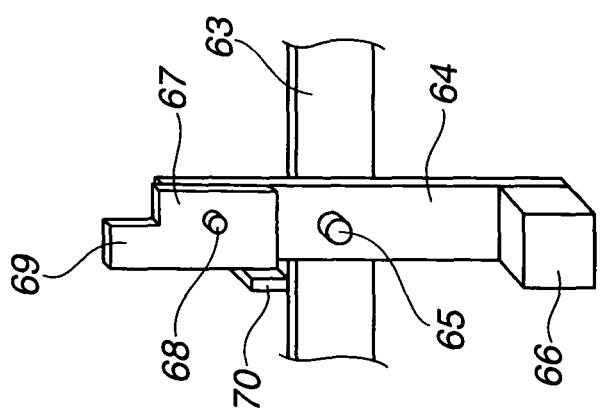

A rotation stopper 70 is mounted on swingable member 64, and arranged to limit rotation of the abutting portion 69 in an ascending direction of the incline 35, 36, 43 or 44 from the balance position. Therefore, rotary member 67 can rotate in a descending direction along the incline from the balance position, as shown in FIG. 20B. However, rotary member 67 cannot rotate in the descending direction along the incline as shown in FIG. 20C from the balance position relative to the swing member 64. When an excessive force is applied in the ascending direction, the swing member 64 rotates, as shown in FIG. 20C.

Figure 21:
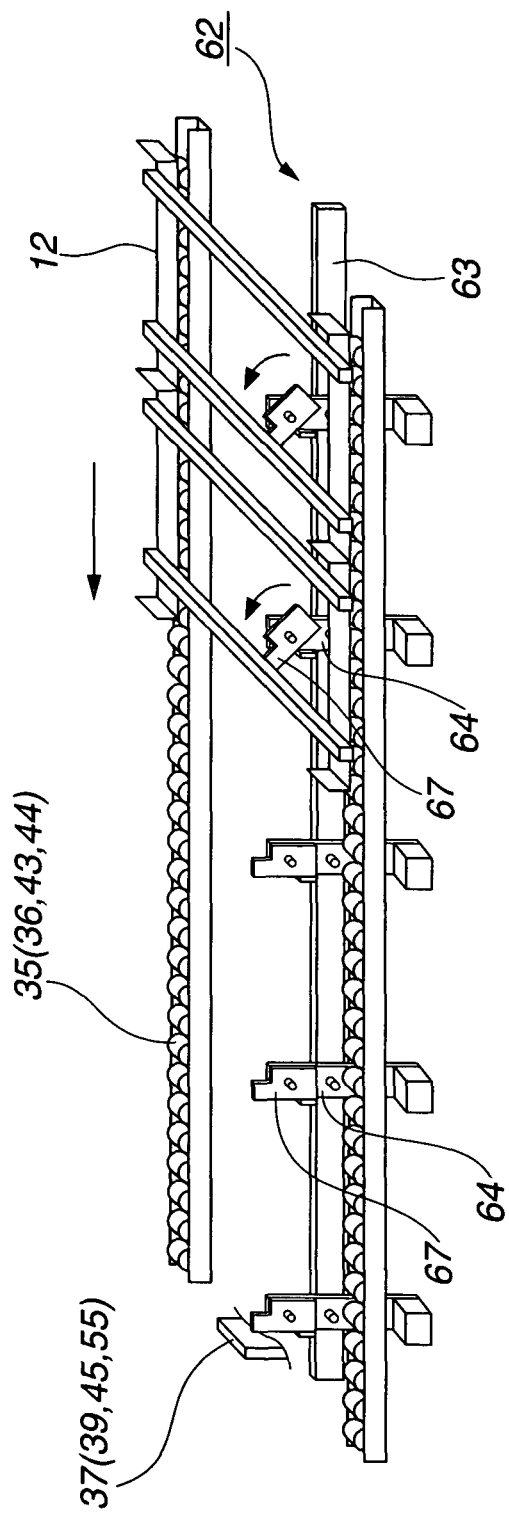
FIG. 21 is a perspective view for illustrating sliding movement of holders 12 on the incline of FIG. 19.
Figure 22:
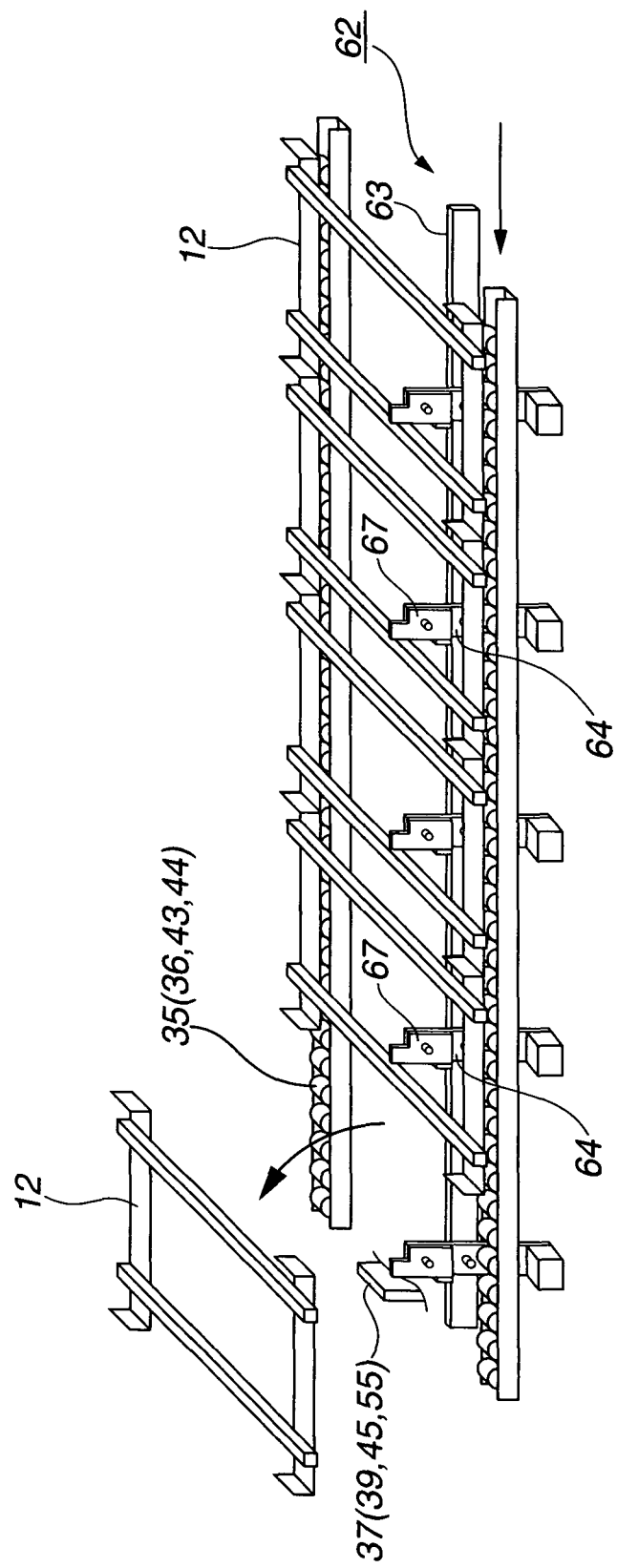
FIG. 22 is a perspective view for showing the driving device when a flat bar is moving in a descending direction of the incline shown in FIG. 19.
Figure 23:
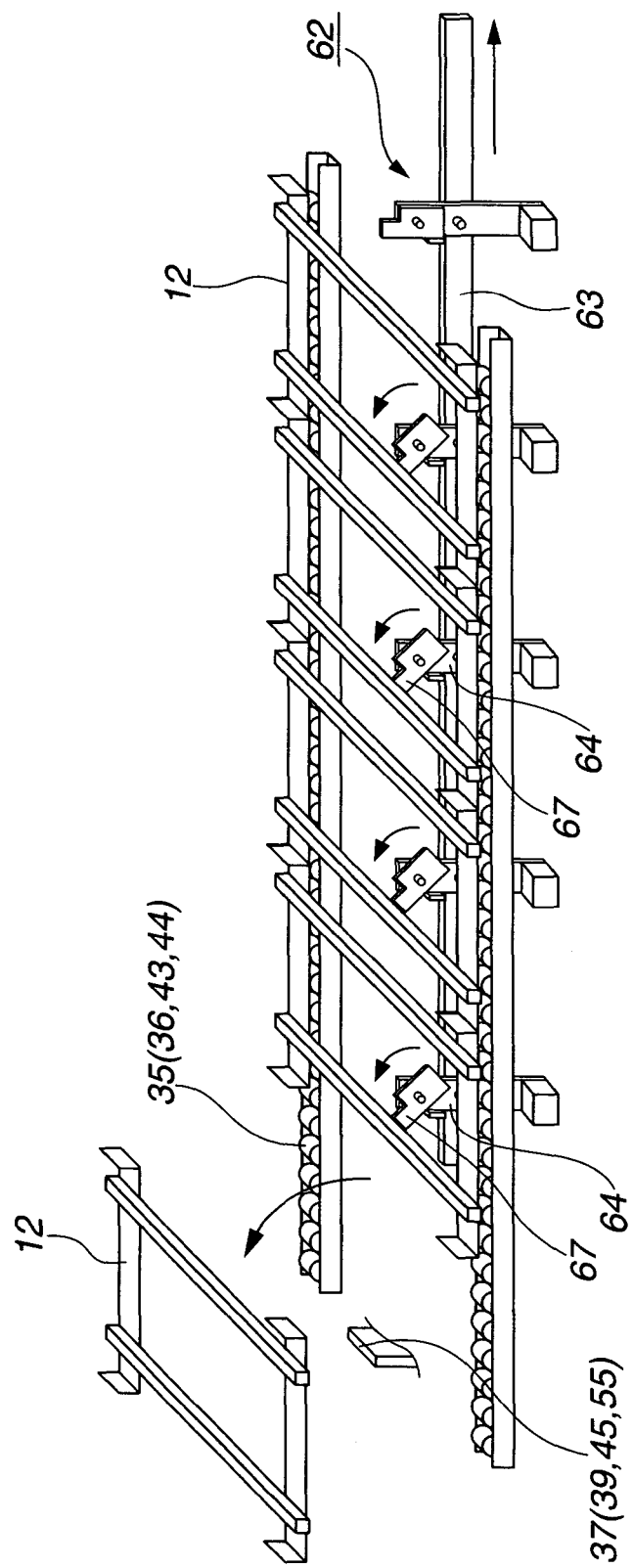
FIG. 23 is a perspective view for showing the driving device when the flat bar is moving in an ascending direction of the incline shown in FIG. 19.
Figure 24:
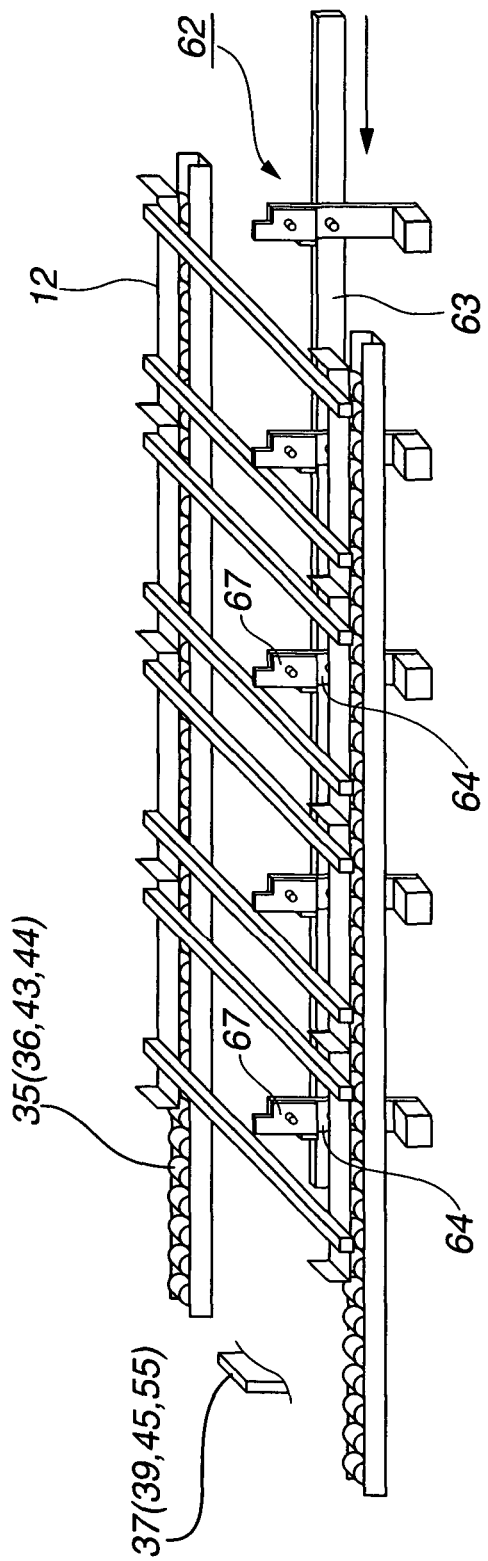
FIG. 24 is a perspective view for showing the driving device when the flat bar is moving in the descending direction of the incline shown in FIG. 19 after the movement in the ascending direction.
Figure 25:
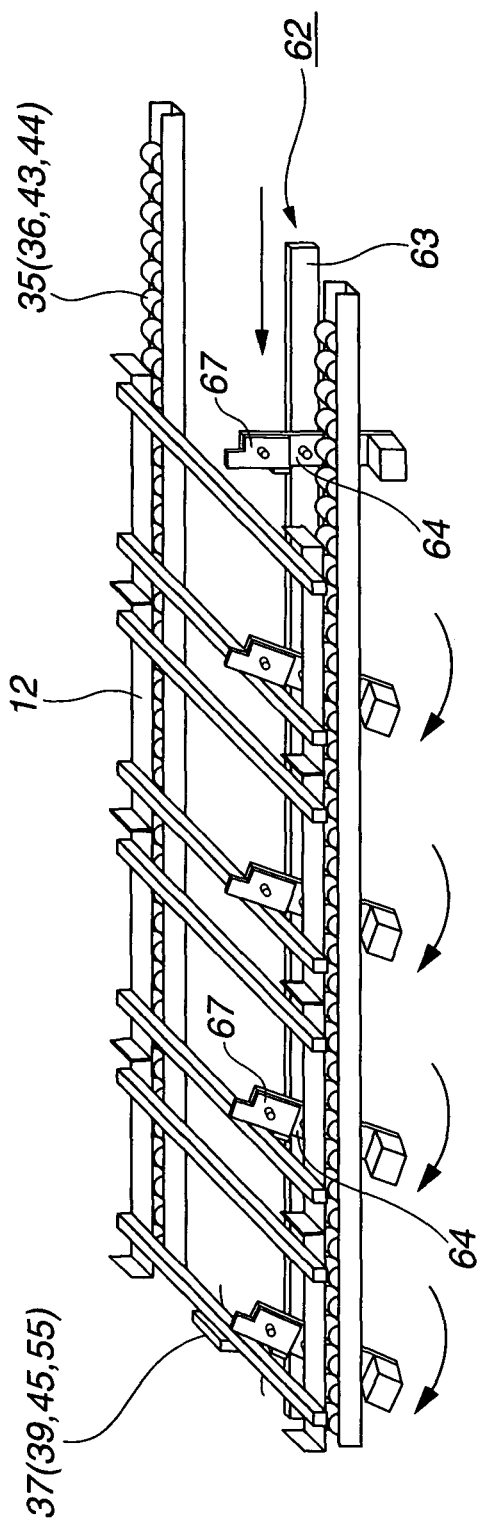
FIG. 25 is a perspective view for showing the driving device when the flat bar is moving in the descending direction and the flow of holders is blocked on the incline shown in FIG. 19.

FIG. 21 is a perspective view for illustrating sliding movement of holders 12 on the incline of FIG. 19. FIG. 22 is a perspective view for showing the driving device when the flat bar is moving in the descending direction of the incline shown in FIG. 19. FIG. 23 is a perspective view for showing the driving device when the flat bar is moving in the ascending direction. FIG. 24 is a perspective view for showing the driving device when the flat bar is moving in the descending direction of the incline shown in FIG. 19 after the movement in the ascending direction. FIG. 25 is a perspective view for showing the driving device when the flat bar is moving in the descending direction and the flow of holders is blocked on the incline.

When a holder 12 slides along the incline 35, 36, 43 or 44, the holder 12 contacts with the abutting portion 69 of rotary member 67 as shown in FIG. 21. Since rotary member 67 is rotatable in the descending direction along the incline, the abutting portion 69 leans in the descending direction and thereby allows passage of the holder 12. This movement of rotary member 67 provides a running or sliding resistance to the holder 12, and serves for adjusting the sliding speed of holder 12. Thus, it is possible to adjust the running resistance to an optimum value by adjusting the position of rotation shaft 68, and the size of rotary member 67, and thereby adjusting the distance from the contact point of rotary member 67 with the holder 12 (the point of application of a force) to the rotation axis and the rotational moment of inertia of rotary member 67. By adjusting the running or sliding resistance in this way, the work transport system of the second embodiment can reduce the impact of collision due to fast sliding movement of holders 12, and prevent disturbance of the work posture and deformation of holders 12 due to impact.

When a holder 12 at the leading position is moved from a series of holders 12 on the incline 35, 36, 43 or 44, as shown in FIG. 22, the remaining holders 12 normally starts moving forwards along the inline spontaneously by their own weights. However, the flow of holders 12 along the incline may be blocked, for example, by the rolling resistance increased by degradation of the roller conveyor or deformation of holders 12. In such a case, the means for pushing holders 12 forcibly is effective. In this embodiment, when rotary member 67 is moved downwards along the incline by flat bar 63 as shown in FIG. 22, rotary member 67 abuts against an adjacent holder 12 remaining stagnant, and pushes the holder 12 forwards because the rotary member 67 cannot rotate in the ascending direction along the incline. Thus, rotary members 67 force holders 12 to start flowing along the incline in the descending direction. It is possible to set the pushing force pushing holders 12 to an optimum value by adjusting the position of the rotary axis of swing member 64, the size of plumb 66 and/or other factors, and thereby adjusting the distance from the contact point of rotary member 67 with the holder 12 (the point of application of a force) to the rotation axis 65 of the swing member and the rotational moment of inertia of swing member 64.

When rotary member 67 is moved. in the ascending direction along the incline by flat bar 63 as shown in FIG. 23, the abutting portion 69 of rotary member 67 abuts against an adjacent holder 12 and rotates in the descending direction, so that the swing member 64 can move in the ascending direction without moving the holder 12 in the ascending direction. Thereafter, as shown in FIG. 24, rotary member 67 swings back to the balance position, swing member 64 moves in the descending direction by the reciprocating motion of flat bar 63, and the abutting portion 69 of rotary member 67 abuts against a holder 12. In this case, since the rotation stopper 70 limits the rotation of rotary member 67 in the ascending direction, the rotary member 67 does not lean, and instead pushes the holder 12 in the descending direction.

When the flow of holders 12 is blocked by stopping device 37 or 45 or stopping member 39 or 55 of the lifter 41 or 52, and the swing members 64 are moved in the descending direction, as shown in FIG. 25, the rotary members 67 can not lean because of the limitation of rotation stopper 70 and each swing member 64 rotates by being pushed by the holder 12 blocked by the stopping device 37 or 45 or stopping member 39 or 55. By allowing the rotation of swing members 64, the driving device 62 does not push the holders 12 excessively, and prevents excessive load from being applied to the stopping device 37 or 45 or the stopping portion 39 or 55.

The present invention is not limited to the illustrated embodiments. Various modifications and variations are possible within the purview of the invention. For example, the work W is not limited to pillar panel, and the work W may be various other objects. Moreover, in dependence on the type of work, it is possible to transport work without using holders 12 and hence to eliminate the holder sliding inclines 44, 27 and 36. Ball casters 19 may be provided in upper housing 21, instead of lower base 20.

According to one aspect of the present invention, a work transport apparatus for transporting a work held in a holder from a work loading position to a work unloading position, comprises: work sliding means for defining a work sliding incline sloping down from an upper end to a lower end in a first direction and sliding a work held on a holder on the work sliding incline; and holder sliding means for defining a holder sliding incline sloping down from an upper end to a lower end in a second direction opposite to the first direction, and sliding a holder in an empty state on the holder sliding incline. One of the work sliding incline and the holder sliding incline is located above the other. The work transport apparatus may include at least one of carriage 4, a work loading mechanism 5 and work unloading mechanism 6.

This application is based on prior Japanese Patent Applications No. 2005-325284 filed in Japan on Nov. 9, 2005 and No. 2006-127713 filed in Japan on May 1, 2006. The entire contents of these Japanese Patent Application Nos. 2005-325284 and 2006-127713 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A work transport apparatus comprising:
 a carriage to carry a work by moving along a guidepath;
 a work loading mechanism to load the work on the carriage at a work loading position on the guidepath; and
 a work unloading mechanism to unload the work from the carriage at a work unloading position on the guidepath;
 wherein each of the work loading mechanism, the carriage and the work unloading mechanism includes a work sliding incline sloping down to move the work, when held on a holder, from the work loading mechanism through the carriage to the work unloading mechanism;
 wherein each of the work unloading mechanism, the carriage and the work loading mechanism includes a holder sliding incline sloping down to move the holder from the work unloading mechanism through the carriage to the work loading mechanism;
 wherein the work transport apparatus further comprises a self-propelled vehicle to move the carriage along the guidepath, and the carriage is connected with the self-propelled vehicle and arranged such that the carriage carries the work from the work loading mechanism to the work unloading mechanism without departing from the guidepath;
 wherein the carriage extends longitudinally from a front side to a rear side, and extends laterally from a first lateral side which is one of left and right sides of the carriage, to a second lateral side which is the other of the left and right sides, the first lateral side of the carriage is configured to face the work loading mechanism at the work loading position to load the work to the work sliding incline of the carriage through the first lateral side, the second lateral side is configured to face the work unloading mechanism at the work unloading position to unload the work through the second lateral side;
 wherein the work sliding incline of the carriage slopes down from the first lateral side to the second lateral side of the carriage and the holder sliding incline slopes down from the second lateral side to the first lateral side of the carriage;
 wherein the holder includes a pair of runners extending in a longitudinal direction and adapted to slide on each of the work sliding inclines and holder sliding inclines and a holding portion to hold the work in an upright posture such that a center of gravity of the work is positioned in a central portion of the holder; and wherein the holding portion includes a pair of first holding portions mounted, respectively, on the pair of runners and at least one second holding portion spaced in the longitudinal direction from the first holding portions and to hold the work in a leaning upright posture so that the center of gravity of the work is positioned in the central portion located between the first holding portions and located in the longitudinal direction between the first holding portions and the second holding portion.

2. The work transport apparatus as claimed in claim 1, further comprising a moving mechanism to move the holder between the holder sliding incline and the work sliding incline of at least one of the work loading mechanism and the work unloading mechanism.

3. The work transport apparatus as claimed in claim 2, wherein, in each of the carriage, the work loading mechanism and the work unloading mechanism, one of the work sliding incline and the holder sliding incline is located above the other of the work sliding incline and the holder sliding incline.

4. The work transport apparatus as claimed in claim 2, wherein: the work sliding incline of the work loading mechanism slopes down from an upper end of that incline on a rear side of the work loading mechanism to a lower end of that incline on a front side of the work loading mechanism facing the guidepath; the holder sliding incline of the work loading mechanism slopes down from an upper end of that incline on the front side of the work loading mechanism to a lower end of that incline on the rear side of the work loading mechanism; the holder sliding incline of the work unloading mechanism slopes down from an upper end of that incline on a rear side of the work unloading mechanism to a lower end of that incline on a front side of the work unloading mechanism facing the guidepath; the work sliding incline of the work unloading mechanism slopes down from an upper end of that incline on the front side of the work unloading mechanism to a lower end of that incline on the rear side of the work unloading mechanism; the work sliding incline of the carriage slopes down from an upper end of that incline on the first lateral side of the carriage to a lower end of that incline on the second lateral side of the carriage which is adapted to confront the front side of the work unloading mechanism when the carriage is held at the work unloading position on the guidepath; and the holder sliding incline of the carriage slopes down from an upper end of that incline on the second lateral side of the carriage to a lower end of that incline on the first lateral side of the carriage which is adapted to confront the front side of the work loading mechanism.

5. The work transport apparatus as claimed in claim 4, wherein: the work transport apparatus further comprises a stopping device arranged to regulate movement of a load on one of the inclines along the one incline; and the stopping device includes a stopping member which is arranged to move between (i) an upper position to prevent sliding movement of the load on the one incline by projecting from the one incline at a lower end of the one incline and (ii) a lower position to allow sliding movement of the load on the one incline.

6. The work transport apparatus as claimed in claim 5, wherein the work transport apparatus further comprises a releasing portion arranged to abut against the stopping device and thereby to move the stopping member from the upper position to prevent sliding movement of the load on the incline, to the lower position to allow sliding movement of the load, in response to approaching movement of the carriage to one of the work loading mechanism and the work unloading mechanism.

7. The work transport apparatus as claimed in claim 4, wherein the work sliding incline of the work unloading mechanism includes: a rear portion extending toward the upper end of that incline from the lower end of that incline on the rear side of the work unloading mechanism; and a front portion which extends from the upper end of that incline to the rear portion of that incline and which is arranged to move up and down.

8. The work transport apparatus as claimed in claim 4 wherein the moving mechanism comprises a lifter which is provided on the rear side of one of the work loading mechanism and the work unloading mechanism, and which includes a platform to support the holder and to move up and down between the holder sliding incline and the work sliding incline of the one of the work loading mechanism and the work unloading mechanism, to move the holder therebetween.

9. The work transport apparatus as claimed in claim 8, wherein the platform of the lifter is arranged to vary an inclination of the platform.

10. The work transport apparatus as claimed in claim 8, wherein the work transport apparatus comprises: the lifter which is a first lifter to move the holder from the lower end of the holder sliding incline to the upper end of the work sliding incline of the work loading mechanism; and a second lifter to move the holder from the lower end of the work sliding incline to the upper end of the holder sliding incline of the work unloading mechanism.

11. The work transport apparatus as claimed in claim 1, wherein the work transport apparatus further comprises a first handling robot to feed the work to the work loading mechanism by putting the work on the holder, and a second handling robot to remove the work from the work unloading mechanism by removing the work from the holder.

12. The work transport apparatus as claimed in claim 1, wherein: the carriage includes a lower base and an upper housing mounted on the lower base and so arranged that the upper housing is movable horizontally relative to the lower base; and the work sliding incline and the holder sliding incline of the carriage are provided in the upper housing.

13. The work transport apparatus as claimed in claim 1, wherein the work transport apparatus further comprises:
  a first connecting device to draw the work sliding incline and the holder sliding incline of the carriage at the work loading position toward the work loading mechanism so that the work sliding incline of the work loading mechanism and the work sliding incline of the carriage are aligned to allow the work on the holder to slide continuously from the work sliding incline of the work loading mechanism to the work sliding incline of the carriage, and the holder sliding incline of the carriage and the holder sliding incline of the work loading mechanism are aligned to allow the holder to slide continuously from the holder sliding incline of the carriage to the holder sliding incline of the work loading mechanism; and
  a second connecting device to draw the work sliding incline and the holder sliding incline of the carriage at the work unloading position toward the work unloading mechanism so that the work sliding incline of carriage and the work sliding incline of the work unloading mechanism are aligned to allow the work on the holder to slide continuously from the work sliding incline of the carriage to the work sliding incline of the work unloading mechanism, and the holder sliding incline of work unloading mechanism and the holder sliding incline of the carriage are aligned to allow the holder to slide continuously from the holder sliding incline of the work unloading mechanism to the holder sliding incline of the carriage.

14. The work transport apparatus as claimed in claim 1, wherein the work transport apparatus further comprises a plurality of holders, each of which includes a runner and a holding portion to hold a respective work so that a center of gravity of the work is positioned at a middle of the holder.

15. The work transport apparatus as claimed in claim 1, wherein at least one of the inclines includes a roller conveyor.

16. The work transport apparatus as claimed in claim 1, wherein the work transport apparatus is a system to convey panels for forming vehicle bodies of motor vehicles, from one station to a next station in a production line to produce motor vehicles.

17. The work transport apparatus as claimed in claim 1, wherein at least one of the inclines is a drive incline including a driving device to move the holder on the drive incline.

18. The work transport apparatus as claimed in claim 17, wherein the driving device includes a rotary member which is arranged to rotate in a sloping direction of the drive incline, and which includes a projecting portion projecting from the drive incline when the rotary member is in a balanced state.

19. The work transport apparatus as claimed in claim 18, wherein the driving device includes:
   a driving member adapted to be driven to move back and forth along the drive incline;
   a swingable member mounted on the driving member and arranged to swing in the sloping direction of the drive incline, wherein the rotary member is mounted on the swingable member and arranged to rotate in the sloping direction; and
   a rotation stopper mounted on the swingable member and arranged to limit rotation of the rotary member in an ascending direction along the drive incline.

20. The work transport apparatus as claimed in claim 19, wherein the driving member is always driven to move back and forth.

21. The work transport apparatus as claimed in claim 1, wherein each of the work loading mechanism, the carriage and the work unloading mechanism includes the work sliding incline adapted to carry the holder, which is holding the work, forward from the work loading mechanism through the carriage to the work unloading mechanism, and each of the work unloading mechanism, the carriage and the work loading mechanism includes the holder sliding incline to return the holder in an empty state holding no work after removal of the work from the holder at the work unloading position, backward from the work unloading mechanism through the carriage to the work loading mechanism.

22. The work transport apparatus as claimed in claim 1, wherein the carriage includes the work sliding incline adapted to support a plurality of loaded holders each holding a respective work and the holder sliding incline adapted to support a plurality of empty holders holding no work.

23. The work transport apparatus as claimed in claim 1, wherein the self-propelled vehicle and the carriage are arranged as a train such that the self-propelled vehicle pulls the carriage, and the front side of the carriage is connected with a rear end of the self-propelled vehicle.

24. The work transport apparatus as claimed in claim 23, wherein the carriage is configured to remain connected with the self-propelled vehicle as the train on the guidepath at the work loading mechanism and the work unloading mechanism during loading and unloading operations.

25. A work transport method comprising:
   loading a work on a carriage at a work loading position on a guidepath from a work loading station;
   transporting the work with the carriage from the work loading position to a work unloading position along the guidepath; and
   unloading the work from the carriage at the work unloading position on the guidepath, to a work unloading station;
   wherein each of the work loading station, the carriage and the work unloading station is provided with a work sliding incline sloping down to move the work held in a holder from the work loading station through the carriage to the work unloading station; and
   wherein each of the work unloading station, the carriage and the work loading station is provided with a holder sliding incline sloping down to move the holder from the work unloading station through the carriage to the work loading station;
   wherein a work transporting operation of transporting the work with the carriage from the work loading position to the work unloading position along the guidepath is performed by moving the carriage with a self-propelled vehicle along the guidepath;
   wherein the work sliding incline of the carriage slopes down from a first lateral side to a second lateral side of the carriage and the holder sliding incline slopes down from the second lateral side to the first lateral side of the carriage, the first lateral side being one of left and right sides of the carriage, and the second lateral side being the other of the left and right sides of the carriage;
   wherein the holder includes a pair of runners extending in a longitudinal direction and adapted to slide on each of the work sliding inclines and holder sliding inclines and a holding portion to hold the work in an upright posture so that a center of gravity of the work is positioned in a central portion of the holder; and
   wherein the holding portion includes a pair of first holding portions mounted, respectively, on the pair of runners and at least one second holding portion spaced in the longitudinal direction from the first holding portions and to hold the work in a leaning upright posture so that the center of gravity of the work is positioned in the central portion located between the first holding portions and located in the longitudinal direction between the first holding portions and the second holding portion.

26. The work transport method as claimed in claim 25, further comprising: moving the holder between the holder sliding incline and the work sliding incline in at least one of the work loading station and the work unloading station.

27. The work transport method as claimed in claim 25, wherein, in each of the carriage, the work loading station and the work unloading station, one of the work sliding incline and the holder sliding incline is located above the other of the work sliding incline and the holder sliding incline.

28. The work transport method as claimed in claim 25, wherein the work transport method comprises:
   loading the work on the carriage at the work loading position on the guidepath, by allowing the holder, which holds the work, to slide from the work sliding incline of the work loading station to the work sliding incline of the carriage;
   transporting the work held in the holder with the carriage from the work loading position to the work unloading position along the guidepath; and
   unloading the work from the carriage at the work unloading position on the guidepath by allowing the holder holding the work to slide from the work sliding incline of the carriage to the work sliding incline of the work unloading station;

loading the holder in an empty state onto the carriage at the work unloading position by allowing the holder in the empty state to slide from the holder sliding incline of the work unloading station to the holder sliding incline of the carriage;

transporting the holder in the empty state with the carriage from the work unloading position to the work loading position along the guidepath which forms a closed path; and unloading the holder in the empty state from the carriage at the work loading position by allowing the holder in the empty state to slide from the holder sliding incline of the carriage to the holder sliding incline of the work loading station.

29. The work transport method as claimed in claim 28, wherein a work loading operation of loading the work on the carriage at the work loading position further comprises:

a connecting operation of connecting the work sliding incline of the carriage with the work sliding incline of the work loading station and connecting the holder sliding incline of the carriage with the holder sliding incline of the work loading station;

wherein a work unloading operation of unloading the work from the carriage at the work unloading position further comprises:

a connecting operation of connecting the work sliding incline of the carriage with the work sliding incline of the work unloading station and connecting the holder sliding incline of the carriage with the holder sliding incline of the work unloading station.

30. The work transport method as claimed in claim 25, wherein a work unloading operation of unloading a work from the carriage at the work unloading position comprises:

an incline lowering operation of lowering a front portion of the work sliding incline of the work unloading station to a lower position to connect the front portion of that work sliding incline with the work sliding incline of the carriage;

a work receiving operation of receiving the holder, which holds the work, from the work sliding incline of the carriage to the front portion of the work sliding incline of the work unloading station; and an incline raising operation of raising an upstream portion to a higher position to connect the front portion of the work sliding incline with a rear portion of the work sliding incline of the work unloading station.

31. The work transport method as claimed in claim 25, wherein the work transport method further comprises:

feeding the work to the work loading station by placing the work on the holder;

removing the work from the work unloading station by removing the work from the holder; and circulating a plurality of holders through a closed path formed by the work sliding incline of the work loading station, the work sliding incline of the carriage, the work sliding incline of the work unloading station, the holder sliding incline of the work unloading station, the holder sliding incline of the carriage, and the holder sliding incline of the work loading station.

32. The work transport method as claimed in claim 31, wherein a holder circulating operation of circulating holders through the closed path comprises:

a holder lifting operation of lifting the holder from a rear end of the holder sliding incline of the work loading station, to a rear end of the work sliding incline of the work loading station which is located just above the holder sliding incline of the work loading station; and a holder lowering operation of lowering the holder from a rear end of the work sliding incline of the work unloading station to a rear end of the holder sliding incline of the work unloading station which is located just below the work sliding incline of the work unloading station.

33. The work transport method as claimed in claim 32, wherein a work feeding operation of feeding the work to the work loading station comprises a holder sliding operation of sliding the holder onto the work sliding incline of the work loading station by inclining a platform to lift the holder from the holder sliding incline of the work loading station to the work sliding incline of the work loading station.

34. The work transport method as claimed in claim 25, wherein the work transport method further comprises:

driving the holder to slide down along a drive incline which is one of the inclines.

35. The work transport method as claimed in claim 34, wherein the work transport method further comprises:

adjusting a sliding condition of the holder sliding down along the drive incline.

36. The work transport method as claimed in claim 25, wherein the self-propelled vehicle and the carriage are arranged as a train such that the self-propelled vehicle pulls the carriage, and a front side of the carriage is connected with a rear end of the self-propelled vehicle.

37. The work transport method as claimed in claim 36, wherein the carriage is configured to remain connected with the self-propelled vehicle as the train on the guidepath at the work loading position and the work unloading position during loading and unloading operations.

38. A method of forming a vehicle component assembly, comprising:

executing the method of claim 25, wherein the work is a sub-component of the vehicle component assembly, to form the vehicle component assembly.

39. A method of forming a vehicle body, comprising:

executing the method of claim 25, wherein the work is a panel of the vehicle body, to form the vehicle body.

40. A work transport apparatus comprising:

a self-propelled vehicle to move along a guidepath;
a carriage connected with the self-propelled vehicle and arranged to carry a work along the guidepath;
a work loading mechanism to load the work on the carriage at a work loading position on the guidepath; and
a work unloading mechanism to unload the work from the carriage at a work unloading position on the guidepath;
wherein each of the work loading mechanism, the carriage and the work unloading mechanism includes a work sliding incline sloping down to move the work held on a holder from the work loading mechanism through the carriage to the work unloading mechanism;
wherein each of the work unloading mechanism, the carriage and the work loading mechanism includes a holder sliding incline sloping down to move the holder from the work unloading mechanism through the carriage to the work loading mechanism;
wherein the holder includes a pair of runners extending in a longitudinal direction and adapted to slide on each of the work sliding inclines and holder sliding inclines and a holding portion to hold the work in an upright posture so that a center of gravity of the work is positioned in a central portion of the holder; and
wherein the holding portion includes a pair of first holding portions mounted, respectively, on the pair of runners and at least one second holding portion spaced in the longitudinal direction from the first holding portions and to hold the work in a leaning upright posture so that the center of gravity of the work is positioned in the central portion located between the first holding portions and located in the longitudinal direction between the first holding portions and the second holding portion.

* * * * *